(12) United States Patent
Sugahara

(10) Patent No.: US 7,194,208 B2
(45) Date of Patent: Mar. 20, 2007

(54) WAVELENGTH-DIVISION MULTIPLEXING OPTICAL TRANSMISSION SYSTEM AND OPTICAL COMMUNICATION METHOD

(75) Inventor: Hiroto Sugahara, Tokyo (JP)

(73) Assignee: NEC Corporation (JP)

( * ) Notice: Subject to any disclaimer, the term of this patent is extended or adjusted under 35 U.S.C. 154(b) by 683 days.

(21) Appl. No.: 10/356,545

(22) Filed: Feb. 3, 2003

(65) Prior Publication Data
US 2003/0215237 A1 Nov. 20, 2003

(30) Foreign Application Priority Data
Feb. 1, 2002 (JP) ............... 2002-026071

(51) Int. Cl.
*H04B 1/12* (2006.01)
*H04B 10/18* (2006.01)

(52) U.S. Cl. .................. 398/81; 398/147; 398/91; 359/337.5

(58) Field of Classification Search ........ 398/147–150, 398/81
See application file for complete search history.

(56) References Cited

U.S. PATENT DOCUMENTS

| | | | | |
|---|---|---|---|---|
| 5,159,282 | A * | 10/1992 | Serizawa et al. ......... | 329/316 |
| 5,214,391 | A * | 5/1993 | Serizawa et al. ......... | 329/316 |
| 5,283,531 | A * | 2/1994 | Serizawa et al. ......... | 329/316 |
| 5,701,188 | A * | 12/1997 | Shigematsu et al. ...... | 398/148 |
| 5,875,209 | A * | 2/1999 | Ogata ..................... | 375/211 |
| 5,877,879 | A | 3/1999 | Naito | |
| 6,078,418 | A * | 6/2000 | Hansen et al. ............ | 398/147 |
| 6,295,152 | B1 * | 9/2001 | Wedding .................. | 398/209 |
| 6,307,988 | B1 * | 10/2001 | Eggleton et al. .......... | 385/37 |
| 6,332,054 | B1 | 12/2001 | Ito | |

(Continued)

FOREIGN PATENT DOCUMENTS

EP 1 117 200 A2 7/2001

(Continued)

OTHER PUBLICATIONS

Abstract of Fukuchi et al. re 1.1-Tb/s (55 × 20 Gb/s) Dense WDM Soliton Transmission Over 30,020-km Widely-Dispersion-Managed Transmission Line Employing 1.55/1.58-μm Hybrid Repeaters, C&C Media Research Laboratories, NEC Corporation; Yokohama Research Laboratories, Sumitomo Electric Industries, Ltd.; Oki Electric Industry; Graduate School of Engineering, Osaka University, and Kochi University of Technology and NTT Science and Core Technology Laboratory Group (JAPAN).

(Continued)

*Primary Examiner*—Jason Chan
*Assistant Examiner*—Danny Wai Lun Leung
(74) *Attorney, Agent, or Firm*—Dickstein, Shapiro, LLP.

(57) ABSTRACT

A wavelength-division multiplexing optical transmission system for providing a compensating-purpose dispersion D2 to a wavelength-division multiplexing optical signal to be transmitted through an optical transmission path from a transmitter terminal to a receiver terminal. The compensating-purpose dispersion D2 satisfies conditions that at any wavelength "$\lambda$" included in the transmission wavelength band, if $dD1(\lambda)/d\lambda \neq 0$ is established, then $\{dD1(\lambda)/d\lambda\} \times \{dD2(\lambda)/d\lambda\} < 0$ is also established, and if $dD1(\lambda)/d\lambda = 0$ is established, then $dD2(\lambda)/d\lambda = 0$ is also established, where D1 represents a dispersion generated in the wavelength-division multiplexing optical signal during when the wavelength-division multiplexing optical signal is transmitted through the transmission path from the transmitter terminal to the receiver terminal.

38 Claims, 13 Drawing Sheets

U.S. PATENT DOCUMENTS

| | | |
|---|---|---|
| 6,462,844 B1 | 10/2002 | Kai et al. |
| 6,515,793 B2 * | 2/2003 | Edagawa et al. ............ 359/326 |
| 6,519,065 B1 * | 2/2003 | Colbourne et al. ........... 398/81 |
| 6,532,330 B1 * | 3/2003 | Mollenauer ................. 385/123 |
| 6,542,275 B1 * | 4/2003 | Sardesai ..................... 398/147 |
| 6,654,564 B1 * | 11/2003 | Colbourne et al. ......... 398/147 |
| 6,865,326 B2 * | 3/2005 | Kato .......................... 385/123 |

FOREIGN PATENT DOCUMENTS

| | | |
|---|---|---|
| JP | 61-38908 | 2/1986 |
| JP | 62-18131 | 1/1987 |
| JP | 8-331049 | 12/1996 |
| JP | 9-46318 | 2/1997 |
| JP | 10-39154 | 2/1998 |
| JP | 11-275020 | 10/1999 |
| JP | 11284263 | 10/1999 |
| JP | 2000-82995 | 3/2000 |
| JP | 2000-221338 | 8/2000 |
| JP | 2000-261376 | 9/2000 |
| JP | 2001-86065 | 3/2001 |
| JP | 2001-103006 | 4/2001 |
| JP | 2001-197003 | 7/2001 |
| JP | 2001-203670 | 7/2001 |
| JP | 2001-358656 | 12/2001 |

OTHER PUBLICATIONS

Morita et al., "Benefit of Raman amplification in ultra-long-distance 40 Gbit/s-based WDM transmission", KDDD R&D Laboratories, Inc., Saitama, Japan.

English abstract and concise explanation of JP 2000-221338.

English abstract and concise explanation of JP 11284263.

English abstract and concise explanation of JP 2001-103006.

English abstract and concise explanation of JP 62-18131.

Abstract re Inada et al., "2400-km transmission of 100-GHz-spaced 40-Gb/s WDM signals using a "double-hybrid" fiber configuration".

* cited by examiner

At this wavelength, transmission terminal dispersion compensation is optimized

WAVELENGTH-DIVISION MULTIPLEXING OPTICAL TRANSMISSION SYSTEM AND OPTICAL COMMUNICATION METHOD

BACKGROUND OF THE INVENTION

1. Field of the Invention

The present invention relates to a wavelength division multiplexing optical transmission system and an optical communication method, and more particularly to a wavelength division multiplexing optical transmission system compensating a dispersion at an transmission terminal.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

In recent years, there have been aggressive researches and developments of technologies of long-distance optical transmissions at a high bit rate in the wavelength division multiplexing optical transmission system. Such technologies are disclosed, for example, (1) by K. Fukuchi et. al. in European Conference On Optical Communication, 1999, PD2-10, September 1999, entitled "1-Tb/s (55×20-Gb/s) dense WDM solution transmission over 3020 km widely-dispersion-managed transmission line employing 1.55/1.58-μm hybrid repeaters", (2) by I. Morita et al. in Optical Fiber Communication Conference 2001, TuF5, March 2001, entitled "Benefit Of Raman Amplification In Ultra-Long-Distance 40 Gbit/s-based WDM transmission", and (3) Y. Inada et al. in Electronic Information Communications Association, Communication Society B-10-78, September 2001 entitled "40 Gb/s EDM-2400 km Transmission Using Double-Hybrid Transmission Line".

In order to realize a long-distance optical transmission at a high bit rate, it is important to reduce a dispersion slope of an optical fiber and namely reduce a wavelength-dependency of a dispersion appearing in the optical fiber. In the prior techniques disclosed in the above-mentioned literatures, a dispersion-flat transmission line is used, which utilizes a combination of a core-enlarged pure silica core fiber and a slope-compensated dispersion compensation fiber. In the dispersion-flat transmission line, a positive dispersion slope processed by the core-enlarged pure silica core fiber is compensated by a negative dispersion slope processed by the slope-compensated dispersion compensation fiber, whereby a total dispersion slope or an effective dispersion slope is reduced.

Even if the dispersion-flat transmission line is used, it is difficult for the present fiber-fabricating technique to reduce the dispersion slope into zero. In accordance with the first prior art disclosed in the above described first literature (1), an averaged dispersion value of the dispersion-flat transmission line takes a maximum in the vicinity of a center of a transmission band. Further, the dispersion-flat transmission line has such a wavelength-dependency of the dispersion value that the dispersion value becomes higher in a center wavelength band. The above described first literature (1) describes that the dispersion-flat transmission line exhibits a dispersion difference of about 150 ps/nm in long-distance optical transmissions of 3000 km between at a dispersion-maximum wavelength and at a dispersion-minimum wavelength in the transmission band. This dispersion difference is serious and large problem for the wavelength division multiplexing optical transmission system with a high bir rate of 40 Gb/s.

Transmission terminal separate dispersion-compensating methods as examples of the conventional techniques for compensating the dispersion slope of the transmission lines are disclosed in Japanese laid-open patent publications Nos. 62-18131 and 9-46318, wherein in a transmission station for multiplexing optical signals, respective optical signals are given different dispersions which depend on respective wavelengths prior to the multiplexing, whereby the dispersion slope of the transmission line is compensated. The dispersion compensation fiber is used for compensating the dispersion slope.

In accordance with the above transmission terminal separate dispersion-compensating methods, the same number dispersion apparatus as the number of channels to be multiplexed are needed. This results in an undesired enlargement of the apparatus of the transmission station and an undesired increase in the cost of the apparatus.

Further, the above transmission terminal separate dispersion-compensating methods are not practically applicable to the wavelength division multiplexing optical transmission system using a polarization interleaving multiplexing technique. In order to apply the polarization interleaving multiplexing technique, it is necessary that polarized waves remain conserved or preserved until the polarized waves are multiplexed. It is, however, very difficult for the present fiber-fabricating technique to prepare a polarization-conserving dispersion-compensating fiber which conserves the polarized waves until the polarized waves are multiplexed. For those reasons, it is thus difficult that the transmission terminal separate dispersion-compensating method compensating the dispersion by the dispersion-compensating fiber is used in conjunction with the polarization interleaving multiplexing technique.

Other dispersion-compensating techniques are disclosed in Japanese laid-open patent publications Nos. 2001-86065 and 2001-103006, wherein Faraday rotator mirror is used for a dispersion-compensating apparatus which compensates the dispersion with conserving the polarized waves. The use of the dispersion-compensating apparatus using the Faraday rotator mirror results in undesired size-enlargement and cost-increase of the apparatus.

In order to render available the desired utilization of the polarization interleaving multiplexing technique, sill another dispersion-compensating method is utilized in many optical transmission systems, wherein optical signals are multiplexed to generate a wavelength division multiplexing optical signal which is then entered into and transmitted through a dispersion compensation fiber for compensating the dispersion slope. In this case, the dispersion compensation fiber to be used for compensating the dispersion slope does not need to conserve the polarized waves. The prior arts disclosed in the above-described literatures (1), (2) and (3) also utilize this dispersion-compensating methods. It is practically difficult for the known dispersion compensation fiber to perform a desired optimum compensation to the dispersion of the optical signal in a full transmission-wavelength band.

A conventional wavelength-dispersion compensating device as yet another technique for compensating the dispersion slope of the transmission line is disclosed in Japanese laid-open patent publication No. 11-284263. This conventional wavelength-dispersion compensating device demultiplexes multiplexed optical signals by a wavelength division multiplexing filter, and compensates respective dispersions of respective demultiplexed-optical signals by a grating fiber, and further re-multiplexes the dispersion-compensated demultiplexed-optical signals. The last-mentioned Japanese publication No. 11-284263 discloses that the conventional wavelength-dispersion compensating device is inserted into the middle of the transmission line of the optical transmission system.

A conventional optical waveguide grating as further another technique for compensating the dispersion slope of the transmission line is disclosed in Japanese laid-open patent publication No. 2000-221338. This conventional optical waveguide grating is used as a dispersion-compensating device which performs simultaneous compensations of optical signals multiplexed. The conventional optical waveguide grating has a secondary-functionally variation of grating pitch along a longitudinal direction of the optical waveguide, so as to enable the conventional optical waveguide grating to perform simultaneous compensation of the dispersion and the dispersion slope. This Japanese publication No. 2000-221338 does not address where the conventional optical waveguide grating is used in the optical transmission system.

A furthermore conventional technique for simultaneously reducing both the dispersion and the dispersion slope is disclosed in Japanese laid-open patent publication No. 2001-197003, wherein a dispersion-compensating device includes a first compensating means having a wavelength-dependent variable wavelength-dispersion characteristic dependent upon wavelength for compensating a dispersion slope of an inputted optical signal and a second compensating means having a wavelength-independent constant wavelength-dispersion characteristic being constant independently from wavelength for compensating a dispersion of the inputted optical signal. A dispersion compensation fiber (DCF) is used as the first compensating means for compensating the dispersion slope of the inputted optical signal. A virtually imaged phased array compensator is used as the second compensating means for compensating the dispersion of the inputted optical signal. This Japanese publication No. 2001-197003 also discloses that this dispersion-compensating device may be placed at any position of the optical transmission system.

In the above circumstances, the development of novel wavelength division multiplexing optical transmission system and optical communication method free from the above problems were desirable.

SUMMARY OF THE INVENTION

Accordingly, it is an object of the present invention to provide a novel wavelength division multiplexing optical transmission system free from the above problems.

It is a further object of the present invention to provide a novel wavelength division multiplexing optical transmission system capable of performing an appropriate compensation to a dispersion of an optical signal for reducing a bit error rate and improving transmission characteristics such as an eye aperture degradation at a reduced cost.

It is a still further object of the present invention to provide a novel wavelength division multiplexing optical transmission system allowing both an application of a polarization interleaving multiplexing technique and an appropriate compensation to a dispersion of an optical signal for realizing improved transmission characteristics at a reduced cost.

It is yet a further object of the present invention to provide a novel optical communication method free from the above problems.

It is furthermore object of the present invention to provide a novel optical communication method capable of performing an appropriate compensation to a dispersion of an optical signal for reducing a bit error rate and improving transmission characteristics such as an eye aperture degradation at a reduced cost.

It is moreover object of the present invention to provide a novel optical communication method allowing both an application of a polarization interleaving multiplexing technique and an appropriate compensation to a dispersion of an optical signal for realizing improved transmission characteristics at a reduced cost.

The present invention provides a wavelength-division multiplexing optical transmission system including:

an optical multiplexer for multiplexing plural optical input signals having wavelengths included in a predetermined transmission wavelength band and generating a wavelength-division multiplexing optical signal;

a dispersion-compensating device for performing a dispersion compensation to the wavelength-division multiplexing optical signal;

an optical transmission path for transmitting the wavelength-division multiplexing optical signal from a transmitter terminal to a receiver terminal; and an optical receiver for receiving the wavelength-division multiplexing optical signal transmitted through the optical transmission path, wherein the dispersion-compensating device provides a compensating-purpose dispersion D2 to the wavelength-division multiplexing optical signal, and wherein the compensating-purpose dispersion D2 satisfies conditions that at any wavelength "$\lambda$" included in the transmission wavelength band, if $dD1(\lambda)/d\lambda \neq 0$ is established, then $\{dD1(\lambda)/d\lambda\} \times \{dD2(\lambda)/d\lambda\} < 0$ is also established, and if $dD1(\lambda)/d\lambda=0$ is established, then $dD2(\lambda)/d\lambda=0$ is also established, where D1 represents a dispersion generated in the wavelength-division multiplexing optical signal during when the wavelength-division multiplexing optical signal is transmitted through the transmission path from the transmitter terminal to the receiver terminal.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
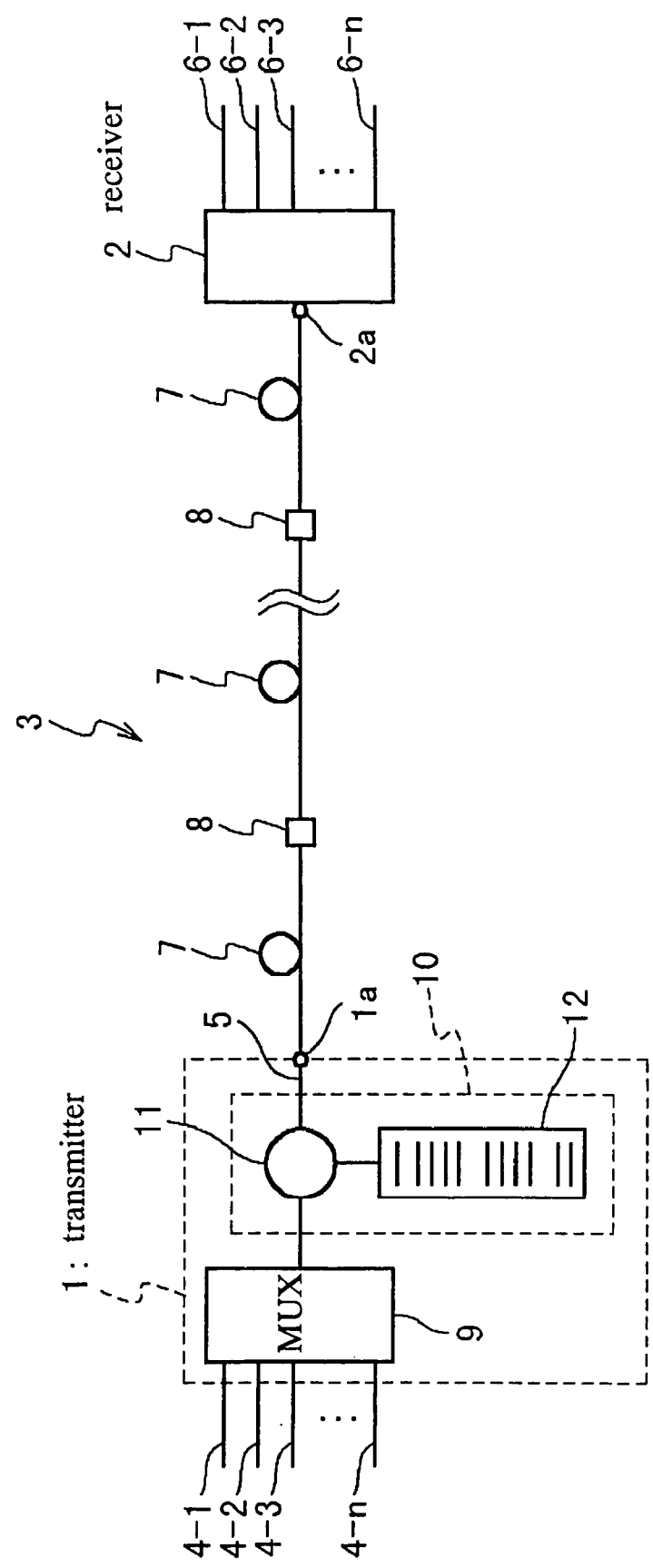
FIG. 1 is a diagram illustrative of a novel optical transmission system in a preferred embodiment of the present invention.

A first aspect of the present invention is a wavelength-division multiplexing optical transmission system including:

an optical multiplexer for multiplexing plural optical input signals having wavelengths included in a predetermined transmission wavelength band and generating a wavelength-division multiplexing optical signal;

a dispersion-compensating device for performing a dispersion compensation to the wavelength-division multiplexing optical signal;

an optical transmission path for transmitting the wavelength-division multiplexing optical signal from a transmitter terminal to a receiver terminal; and an optical receiver for receiving the wavelength-division multiplexing optical signal transmitted through the optical transmission path, wherein the dispersion-compensating device provides a compensating-purpose dispersion D2 to the wavelength-division multiplexing optical signal, and wherein the compensating-purpose dispersion D2 satisfies conditions that at any wavelength "λ" included in the transmission wavelength band, if $dD1(\lambda)/d\lambda \neq 0$ is established, then $\{dD1(\lambda)/d\lambda\} \times \{dD2(\lambda)/d\lambda\} < 0$ is also established, and if $dD1(\lambda)/d\lambda = 0$ is established, then $dD2(\lambda)/d\lambda = 0$ is also established, where D1 represents a dispersion generated in the wavelength-division multiplexing optical signal during when the wavelength-division multiplexing optical signal is transmitted through the transmission path from the transmitter terminal to the receiver terminal.

It is also preferable that a dispersion D1 generated in the wavelength division multiplexing optical signal during when the wavelength division multiplexing optical signal is transmitted through the transmission path from the transmitter terminal to the receiver terminal becomes maximum at a specific wavelength "λ1", and the compensating-purpose dispersion D2 becomes minimum at the specific wavelength "λ1".

It is also preferable that a dispersion D1 generated in the wavelength division multiplexing optical signal during when the wavelength division multiplexing optical signal is transmitted through the transmission path from the transmitter terminal to the receiver terminal becomes minimum at a specific wavelength "λ1", and the compensating-purpose dispersion D2 becomes maximum at the specific wavelength "λ1".

It is also preferable that a dispersion D1 generated in the wavelength division multiplexing optical signal during when the wavelength division multiplexing optical signal is transmitted through the transmission path from the transmitter terminal to the receiver terminal is simply increased by increasing wavelength, and the compensating-purpose dispersion D2 is simply decreased by increasing wavelength.

It is also preferable that a dispersion D1 generated in the wavelength division multiplexing optical signal during when the wavelength division multiplexing optical signal is transmitted through the transmission path from the transmitter terminal to the receiver terminal is simply decreased by increasing wavelength, and the compensating-purpose dispersion D2 is simply increased by increasing wavelength.

It is also preferable that the compensating-purpose dispersion D2 is decided so that a sum of the dispersion D1 and the compensating-purpose dispersion D2 is not zero.

It is also preferable that the compensating-purpose dispersion D2 is decided so that a bit error rate of the wavelength division multiplexing optical signal at the receiver terminal becomes minimum at a predetermined wavelength "λ0" included in the transmission wavelength band.

It is also preferable that, at any wavelength "λ", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

It is also preferable that the compensating-purpose dispersion D2 is decided so that an eye aperture degradation of the wavelength division multiplexing optical signal at the receiver terminal becomes minimum at a predetermined wavelength "λ0" included in the transmission wavelength band.

It is also preferable that, at any wavelength "λ", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

It is also preferable that the dispersion-compensating device further includes:

an optical circulator coupled between the optical multiplexer and the transmitter terminal; and a fiber Bragg grating coupled to the optical circulator for receiving the wavelength-division multiplexing optical signal through the optical circulator from the optical multiplexer and performing the dispersion compensation to the wavelength-division multiplexing optical signal, and the fiber Bragg grating has a variation in a grating pitch Λ which is represented by first and second grating pitch functions Λ1(x) and Λ2(x) smoothly and continuously bounded to each other via a reverse curve point, at which the grating pitch $\Lambda$ is equal to a critical grating pitch $\Lambda 1$, and the first grating pitch function $\Lambda 1(x)$ is represented by a first curve being arched upwardly in a first grating pitch range where the grating pitch $\Lambda$ is smaller than the critical grating pitch $\Lambda 1$, while the second grating pitch function $\Lambda 2(x)$ is represented by a second curve being arched downwardly in a second grating pitch range where the grating pitch $\Lambda$ is larger than the critical grating pitch $\Lambda 1$.

A second aspect of the present invention is a wavelength-division multiplexing optical transmission system including:

an optical multiplexer for multiplexing plural optical input signals having wavelengths included in a predetermined transmission wavelength band and generating a wavelength-division multiplexing optical signal;

a dispersion-compensating device for performing a dispersion compensation to the wavelength-division multiplexing optical signal;

an optical transmission path for transmitting the wavelength-division multiplexing optical signal from a transmitter terminal to a receiver terminal; and an optical receiver for receiving the wavelength-division multiplexing optical signal transmitted through the optical transmission path, wherein the dispersion-compensating device provides a compensating-purpose dispersion D2 to the wavelength-division multiplexing optical signal, wherein a dispersion D1 generated in the wavelength division multiplexing optical signal during when the wavelength division multiplexing optical signal is transmitted through the transmission path from the transmitter terminal to the receiver terminal becomes maximum at a specific wavelength "$\lambda 1$", and wherein the compensating-purpose dispersion D2 becomes minimum at the specific wavelength "$\lambda 1$".

It is also preferable that the compensating-purpose dispersion D2 is decided so that a sum of the dispersion D1 and the compensating-purpose dispersion D2 is not zero.

It is also preferable that the compensating-purpose dispersion D2 is decided so that a bit error rate of the wavelength division multiplexing optical signal at the receiver terminal becomes minimum at a predetermined wavelength "$\lambda 0$" included in the transmission wavelength band.

It is also preferable that, at any wavelength "$\lambda$", the compensating-purpose dispersion D2 satisfies an equation given by:

$$D2(\lambda 0)+0.4\{D1(\lambda 0)-D1(\lambda)\} \leq D2(\lambda) D2(\lambda 0)+0.6\{D1(\lambda 0)-D1(\lambda)\}.$$

It is also preferable that the compensating-purpose dispersion D2 is decided so that an eye aperture degradation of the wavelength division multiplexing optical signal at the receiver terminal becomes minimum at a predetermined wavelength "$\lambda 0$" included in the transmission wavelength band.

It is also preferable that, at any wavelength "$\lambda$", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

It is also preferable that the dispersion-compensating device further includes:

an optical circulator coupled between the optical multiplexer and the transmitter terminal; and a fiber Bragg grating coupled to the optical circulator for receiving the wavelength-division multiplexing optical signal through the optical circulator from the optical multiplexer and performing the dispersion compensation to the wavelength-division multiplexing optical signal, and the fiber Bragg grating has a variation in a grating pitch $\Lambda$ which is represented by first and second grating pitch functions $\Lambda 1(x)$ and $\Lambda 2(x)$ smoothly and continuously bounded to each other via a reverse curve point, at which the grating pitch $\Lambda$ is equal to a critical grating pitch $\Lambda 1$, and the first grating pitch function $\Lambda 1(x)$ is represented by a first curve being arched upwardly in a first grating pitch range where the grating pitch $\Lambda$ is smaller than the critical grating pitch $\Lambda 1$, while the second grating pitch function $\Lambda 2(x)$ is represented by a second curve being arched downwardly in a second grating pitch range where the grating pitch $\Lambda$ is larger than the critical grating pitch $\Lambda 1$.

A third aspect of the present invention is a wavelength-division multiplexing optical transmission system including:

an optical multiplexer for multiplexing plural optical input signals having wavelengths included in a predetermined transmission wavelength band and generating a wavelength-division multiplexing optical signal;

a dispersion-compensating device for performing a dispersion compensation to the wavelength-division multiplexing optical signal;

an optical transmission path for transmitting the wavelength-division multiplexing optical signal from a transmitter terminal to a receiver terminal; and an optical receiver for receiving the wavelength-division multiplexing optical signal transmitted through the optical transmission path, wherein the dispersion-compensating device provides a compensating-purpose dispersion D2 to the wavelength-division multiplexing optical signal, wherein a dispersion D1 generated in the wavelength division multiplexing optical signal during when the wavelength division multiplexing optical signal is transmitted through the transmission path from the transmitter terminal to the receiver terminal becomes minimum at a specific wavelength "$\lambda 1$", and wherein the compensating-purpose dispersion D2 becomes maximum at the specific wavelength "$\lambda 1$".

It is also preferable that the compensating-purpose dispersion D2 is decided so that a sum of the dispersion D1 and the compensating-purpose dispersion D2 is not zero.

It is also preferable that the compensating-purpose dispersion D2 is decided so that a bit error rate of the wavelength division multiplexing optical signal at the receiver terminal becomes minimum at a predetermined wavelength "$\lambda 0$" included in the transmission wavelength band.

It is also preferable that, at any wavelength "$\lambda$", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+ 0.6\{D1(\lambda 0)-D1(\lambda)\}.$$

It is also preferable that the compensating-purpose dispersion D2 is decided so that an eye aperture degradation of the wavelength division multiplexing optical signal at the receiver terminal becomes minimum at a predetermined wavelength "$\lambda 0$" included in the transmission wavelength band.

It is also preferable that, at any wavelength "$\lambda$", the compensating-purpose dispersion D2 satisfies an equation given by:

$$D2(\lambda 0)+0.4\{D1(\lambda 0)-D1(\lambda)\} D2(\lambda) \leq D2(\lambda 0)+0.6\{D1(\lambda 0)-D1(\lambda)\}.$$

A fourth aspect of the present invention is a wavelength-division multiplexing optical transmission system including:

an optical multiplexer for multiplexing plural optical input signals having wavelengths included in a predetermined transmission wavelength band and generating a wavelength-division multiplexing optical signal;

a dispersion-compensating device for performing a dispersion compensation to the wavelength-division multiplexing optical signal;

an optical transmission path for transmitting the wavelength-division multiplexing optical signal from a transmitter terminal to a receiver terminal; and an optical receiver for receiving the wavelength-division multiplexing optical signal transmitted through the optical transmission path, wherein the dispersion-compensating device provides a compensating-purpose dispersion D2 to the wavelength-division multiplexing optical signal, wherein a dispersion D1 generated in the wavelength division multiplexing optical signal during when the wavelength division multiplexing optical signal is transmitted through the transmission path from the transmitter terminal to the receiver terminal is simply increased by increasing wavelength, and wherein the compensating-purpose dispersion D2 is simply decreased by increasing wavelength.

A fifth aspect of the present invention is a wavelength-division multiplexing optical transmission system including:

an optical multiplexer for multiplexing plural optical input signals having wavelengths included in a predetermined transmission wavelength band and generating a wavelength-division multiplexing optical signal;

a dispersion-compensating device for performing a dispersion compensation to the wavelength-division multiplexing optical signal;

an optical transmission path for transmitting the wavelength-division multiplexing optical signal from a transmitter terminal to a receiver terminal; and an optical receiver for receiving the wavelength-division multiplexing optical signal transmitted through the optical transmission path, wherein the dispersion-compensating device provides a compensating-purpose dispersion D2 to the wavelength-division multiplexing optical signal, wherein a dispersion D1 generated in the wavelength division multiplexing optical signal during when the wavelength division multiplexing optical signal is transmitted through the transmission path from the transmitter terminal to the receiver terminal is simply decreased by increasing wavelength, and wherein the compensating-purpose dispersion D2 is simply increased by increasing wavelength.

A sixth aspect of the present invention is a dispersion-compensating device for performing a dispersion compensation to a wavelength-division multiplexing optical signal to be transmitted through an optical transmission path from a transmitter terminal to a receiver terminal, wherein the dispersion-compensating device provides a compensating-purpose dispersion D2 to the wavelength-division multiplexing optical signal, and wherein the compensating-purpose dispersion D2 satisfies conditions that at any wavelength "$\lambda$" included in the transmission wavelength band, if $dD1(\lambda)/d\lambda \neq 0$ is established, then $\{dD1(\lambda)/d\lambda\} \times \{dD2(\lambda)/d\lambda\} < 0$ is also established, and if $dD1(\lambda)/d\lambda = 0$ is established, then $dD2(\lambda)/d\lambda = 0$ is also established, where D1 represents a dispersion generated in the wavelength-division multiplexing optical signal during when the wavelength-division multiplexing optical signal is transmitted through the transmission path from the transmitter terminal to the receiver terminal.

It is also preferable that a dispersion D1 generated in the wavelength division multiplexing optical signal during when the wavelength division multiplexing optical signal is transmitted through the transmission path from the transmitter terminal to the receiver terminal becomes maximum at a specific wavelength "$\lambda 1$", and the compensating-purpose dispersion D2 becomes minimum at the specific wavelength "$\lambda 1$".

It is also preferable that a dispersion D1 generated in the wavelength division multiplexing optical signal during when the wavelength division multiplexing optical signal is transmitted through the transmission path from the transmitter terminal to the receiver terminal becomes minimum at a specific wavelength "$\lambda 1$", and the compensating-purpose dispersion D2 becomes maximum at the specific wavelength "$\lambda 1$".

It is also preferable that a dispersion D1 generated in the wavelength division multiplexing optical signal during when the wavelength division multiplexing optical signal is transmitted through the transmission path from the transmitter terminal to the receiver terminal is simply increased by increasing wavelength, and the compensating-purpose dispersion D2 is simply decreased by increasing wavelength.

It is also preferable that a dispersion D1 generated in the wavelength division multiplexing optical signal during when the wavelength division multiplexing optical signal is transmitted through the transmission path from the transmitter terminal to the receiver terminal is simply decreased by increasing wavelength, and the compensating-purpose dispersion D2 is simply increased by increasing wavelength.

It is also preferable that the compensating-purpose dispersion D2 is decided so that a sum of the dispersion D1 and the compensating-purpose dispersion D2 is not zero.

It is also preferable that the compensating-purpose dispersion D2 is decided so that a bit error rate of the wavelength division multiplexing optical signal at the receiver terminal becomes minimum at a predetermined wavelength "$\lambda 0$" included in the transmission wavelength band.

It is also preferable that, at any wavelength "$\lambda$", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+ 0.6\{D1(\lambda 0)-D1(\lambda)\}.$$

It is also preferable that the compensating-purpose dispersion D2 is decided so that an eye aperture degradation of the wavelength division multiplexing optical signal at the receiver terminal becomes minimum at a predetermined wavelength "$\lambda 0$" included in the transmission wavelength band.

It is also preferable that, at any wavelength "$\lambda$", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+ 0.6\{D1(\lambda 0)-D1(\lambda)\}.$$

It is also preferable that the dispersion-compensating device further includes:

an optical circulator coupled between the optical multiplexer and the transmitter terminal; and a fiber Bragg grating coupled to the optical circulator for receiving the wavelength-division multiplexing optical signal through the optical circulator from the optical multiplexer and performing the dispersion compensation to the wavelength-division multiplexing optical signal, and the fiber Bragg grating has a variation in a grating pitch Λ which is represented by first and second grating pitch functions Λ1(x) and Λ2(x) smoothly and continuously bounded to each other via a reverse curve point, at which the grating pitch Λ is equal to a critical grating pitch Λ1, and the first grating pitch function Λ1(x) is represented by a first curve being arched upwardly in a first grating pitch range where the grating pitch Λ is smaller than the critical grating pitch Λ1, while the second grating pitch function Λ2(x) is represented by a second curve being arched downwardly in a second grating pitch range where the grating pitch Λ is larger than the critical grating pitch Λ1.

A seventh aspect of the present invention is a dispersion-compensating device for performing a dispersion compensation to a wavelength-division multiplexing optical signal to be transmitted through an optical transmission path from a transmitter terminal to a receiver terminal, wherein the dispersion-compensating device provides a compensating-purpose dispersion D2 to the wavelength-division multiplexing optical signal, and wherein over the transmission wavelength band, a sign of a dispersion slope of the compensating-purpose dispersion D2 is opposite to a sign of a dispersion slope of a dispersion D1 generated in the wavelength division multiplexing optical signal, during when the wavelength division multiplexing optical signal is transmitted through the transmission path from the transmitter terminal to the receiver terminal, provided that, at a wavelength where the dispersion slope of the dispersion D1 is zero, the dispersion slope of the dispersion D2 is also substantially zero.

An eighth aspect of the present invention is a dispersion-compensating device for performing a dispersion compensation to a wavelength-division multiplexing optical signal to be transmitted through an optical transmission path from a transmitter terminal to a receiver terminal, and the dispersion-compensating device includes:

an optical circulator coupled between the optical multiplexer and the transmitter terminal; and a fiber Bragg grating coupled to the optical circulator for receiving the wavelength-division multiplexing optical signal through the optical circulator from the optical multiplexer and performing the dispersion compensation to the wavelength-division multiplexing optical signal, and the fiber Bragg grating has a variation in a grating pitch Λ which is represented by first and second grating pitch functions Λ1(x) and Λ2(x) smoothly and continuously bounded to each other via a reverse curve point, at which the grating pitch Λ is equal to a critical grating pitch Λ1, and the first grating pitch function Λ1(x) is represented by a first curve being arched upwardly in a first grating pitch range where the grating pitch Λ is smaller than the critical grating pitch Λ1, while the second grating pitch function Λ2(x) is represented by a second curve being arched downwardly in a second grating pitch range where the grating pitch Λ is larger than the critical grating pitch Λ1.

A ninth aspect of the present invention is a method of performing a dispersion compensation to a wavelength-division multiplexing optical signal to be transmitted through an optical transmission path from a transmitter terminal to a receiver terminal, wherein the dispersion compensation is made by providing a compensating-purpose dispersion D2 to the wavelength-division multiplexing optical signal, and wherein the compensating-purpose dispersion D2 satisfies conditions that at any wavelength "λ" included in the transmission wavelength band, if $dD1(\lambda)/d\lambda \neq 0$ is established, then $\{dD1(\lambda)/d\lambda\} \times \{dD2(\lambda)/d\lambda\} < 0$ is also established, and if $dD1(\lambda)/d\lambda = 0$ is established, then $dD2(\lambda)/d\lambda = 0$ is also established, where D1 represents a dispersion generated in the wavelength-division multiplexing optical signal during when the wavelength-division multiplexing optical signal is transmitted through the transmission path from the transmitter terminal to the receiver terminal.

It is also preferable that a dispersion D1 generated in the wavelength division multiplexing optical signal during when the wavelength division multiplexing optical signal is transmitted through the transmission path from the transmitter terminal to the receiver terminal becomes maximum at a specific wavelength "λ1", and the compensating-purpose dispersion D2 becomes minimum at the specific wavelength "λ1".

It is also preferable that a dispersion D1 generated in the wavelength division multiplexing optical signal during when the wavelength division multiplexing optical signal is transmitted through the transmission path from the transmitter terminal to the receiver terminal becomes minimum at a specific wavelength "λ1", and the compensating-purpose dispersion D2 becomes maximum at the specific wavelength "λ1".

It is also preferable that a dispersion D1 generated in the wavelength division multiplexing optical signal during when the wavelength division multiplexing optical signal is transmitted through the transmission path from the transmitter terminal to the receiver terminal is simply increased by increasing wavelength, and the compensating-purpose dispersion D2 is simply decreased by increasing wavelength.

It is also preferable that a dispersion D1 generated in the wavelength division multiplexing optical signal during when the wavelength division multiplexing optical signal is transmitted through the transmission path from the transmitter terminal to the receiver terminal is simply decreased by increasing wavelength, and the compensating-purpose dispersion D2 is simply increased by increasing wavelength.

It is also preferable that the compensating-purpose dispersion D2 is decided so that a sum of the dispersion D1 and the compensating-purpose dispersion D2 is not zero.

It is also preferable that the compensating-purpose dispersion D2 is decided so that a bit error rate of the wavelength division multiplexing optical signal at the receiver terminal becomes minimum at a predetermined wavelength "λ0" included in the transmission wavelength band.

It is also preferable that, at any wavelength "λ", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

It is also preferable that the compensating-purpose dispersion D2 is decided so that an eye aperture degradation of the wavelength division multiplexing optical signal at the receiver terminal becomes minimum at a predetermined wavelength "λ0" included in the transmission wavelength band.

It is also preferable that, at any wavelength "λ", the compensating-purpose dispersion D2 satisfies an equation given by:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

A tenth aspect of the present invention is a method of performing a dispersion compensation to a wavelength-division multiplexing optical signal to be transmitted through an optical transmission path from a transmitter terminal to a receiver terminal, wherein the dispersion compensation is made by providing a compensating-purpose dispersion D2 to the wavelength-division multiplexing optical signal, and wherein over the transmission wavelength band, a sign of a dispersion slope of the compensating-purpose dispersion D2 is opposite to a sign of a dispersion slope of a dispersion D1 generated in the wavelength division multiplexing optical signal, during when the wavelength division multiplexing optical signal is transmitted through the transmission path from the transmitter terminal to the receiver terminal, provided that, at a wavelength where the dispersion slope of the dispersion D1 is zero, the dispersion slope of the dispersion D2 is also substantially zero.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

First Embodiment

A first embodiment according to the present invention will be described in detail with reference to the drawings. FIG. 1 is a diagram illustrative of a novel optical transmission system in a preferred embodiment of the present invention. The optical transmission system includes an optical transmitter 1, an optical receiver 2 and a transmission line 3 which provides an optical transmission path between the optical transmitter 1 and the optical receiver 2. The transmission line 3 is connected at a transmitting terminal 1a to the optical transmitter 1 and also connected at a receiving terminal 2a to the optical receiver 2. The optical transmitter 1 multiplexes optical input signals 4-1, 4-2, 4-3, - - - 4-n which are different in wavelength to generate a wavelength division multiplexing optical signal 5 which will then appear at the transmitting terminal 1a. The wavelength division multiplexing optical signal 5 is then transmitted from the transmitting terminal 1a through the transmission line 3 to the receiving terminal 2a. The optical receiver 2 receives the wavelength division multiplexing optical signal 5 and demultiplexes the wavelength division multiplexing optical signal 5 into a set of optical output signals 6-1, 6-2, 6-3, - - - 6-n which are the same number "n" as the optical input signal 4-1, 4-2, 4-3, - - - 4-n.

The transmission line 3 includes a dispersion-managed fiber (DMF) 7 which further comprises an alternating series connection of pure silica core fibers (PSCF) and dispersion compensation fibers (DCF). A dispersion value of the pure silica core fiber (PSCF) is 20 ps/nm/km, while a dispersion value of the dispersion compensation fiber (DCF) is −60 ps/nm/km. Plural repeaters 8 are inserted into the dispersion-managed fiber (DMF) 7, so that each transmission line unit defined by the repeaters 8 comprises four pairs of the pure silica core fibers (PSCF) and dispersion compensation fibers (DCF) form. One transmission line unit exists between the transmitting terminal 1a and one repeater 8 positioned closest to the optical transmitter 1. Another transmission line unit exists between the receiving terminal 2a and another repeater 8 positioned closest to the optical receiver 2. Each of one or more remaining transmission line units exists between adjacent two of the repeaters 8. An output power of the each repeater 8 is 0 dBm. A total transmission distance of the dispersion-managed fiber (DMF) 7 is 3000 km.

Figure 2:
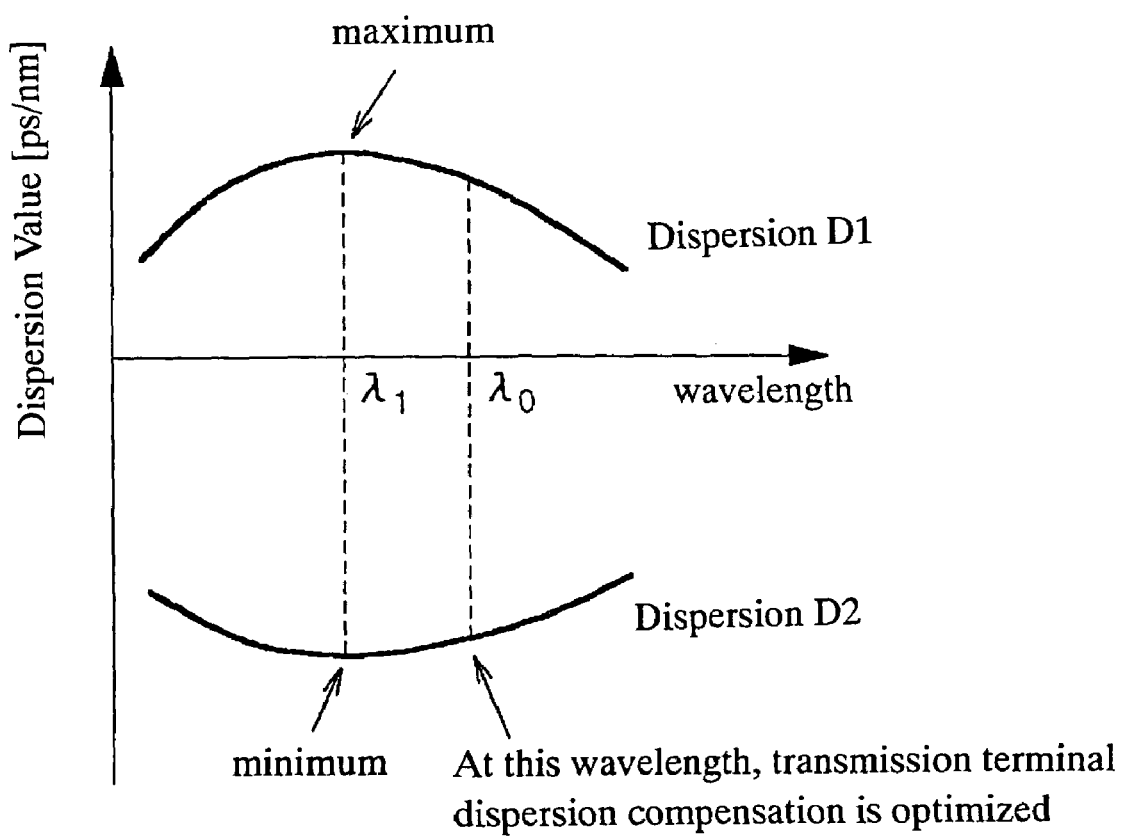
FIG. 2 is a diagram illustrative of wavelength-dependencies of dispersion values of transmission line and Fiber Bragg Grating included in the novel optical transmission system of FIG. 1.

FIG. 2 is a diagram illustrative of wavelength-dependencies of dispersion values of transmission line and Fiber Bragg Grating included in the novel optical transmission system of FIG. 1. An averaged dispersion value D1 of the transmission line 3 is, hereby defined to be a value of dispersion generated in the wavelength division multiplexing optical signal 5 during when the wavelength division multiplexing optical signal 5 is transmitted from the transmitting terminal 1a through the transmission line 3 to the receiving terminal 2a. As shown in FIG. 2, the averaged dispersion value D1 of the transmission line 3 has such a dependency upon wavelength that the averaged dispersion value D1 becomes higher in a center wavelength band and takes a maximum value in the vicinity of the center of the wavelength. For example, the averaged dispersion value D1 takes a maximum value of 150 ps/nm at a wavelength $\lambda 1$ (=1546 nm). A curve of the averaged dispersion value D1 over wavelengths is a center-top arch.

The optical transmitter 1 generates the wavelength division multiplexing optical signal 5 and provides a dispersion to the wavelength division multiplexing optical signal 5, so as to compensate the dispersion, which has been generated in the wavelength division multiplexing optical signal 5 during the transmission through the transmission line 3.

In more details, as shown in FIG. 1, the optical transmitter 1 includes an optical multiplexer 9 and a transmission terminal dispersion compensating device 10. The optical multiplexer 9 multiplexes the optical input signals 4-1, 4-2, 4-3, - - - 4-n to generate the wavelength division multiplexing optical signal 5. The transmission terminal dispersion compensating device 10 receives the wavelength division multiplexing optical signal 5 from the optical multiplexer 9 and provides a dispersion to the wavelength division multiplexing optical signal 5, so that the dispersion given by the transmission terminal dispersion compensating device 10 will compensate another dispersion generated in the wavelength division multiplexing optical signal 5 during when the wavelength division multiplexing optical signal 5 is transmitted through the transmission line 3. The transmission terminal dispersion compensating device 10 performs simultaneous compensations to dispersions of different wavelength components included in the wavelength division multiplexing optical signal 5, for which reason the polarization interleaving multiplexing technique is applicable to the present novel optical transmission system. The application of the polarization interleaving multiplexing technique is preferable in view of improvement in the transmission characteristics. This means it preferable that a polarization direction of each of the optical input signals 4-1, 42, 43, - - - 4-n is different by 90 degrees from a polarization direction of an optical signal having a wavelength closest to the each optical input signal.

The transmission terminal dispersion compensating device 10 providing the dispersion to the wavelength division multiplexing optical signal 5 further includes an optical circulator 11 and a Fiber Bragg Grating 12. The optical circulator 11 receives the wavelength division multiplexing optical signal 5 from the optical multiplexer 9 and transfers the wavelength division multiplexing optical signal 5 to the Fiber Bragg Grating 12. The Fiber Bragg Grating 12 provides a dispersion to the wavelength division multiplexing optical signal 5 and reflects the dispersion-provided wavelength division multiplexing optical signal 5 to the optical circulator 11. The dispersion-provided wavelength, division multiplexing optical signal 5 is transferred through the optical circulator 11 to the transmitting terminal 1a.

With reference again to FIG. 2, the dispersion characteristic with the wavelength-dependency possessed by the Fiber Bragg Grating 12 is so decided that, over the full transmission wavelength band of the optical transmission system, a sign of a dispersion slope of a dispersion D2, which is given by the Fiber Bragg Grating 12 to the wavelength division multiplexing optical signal 5, is opposite to a sign of another dispersion slope of another dispersion D1, which is generated in the wavelength is division multiplexing optical signal 5 during when the wavelength division multiplexing optical signal 5 is transmitted from the transmitting terminal 1a through the transmission line 3 to the receiving terminal 2a, provided that at a wavelength where the dispersion slope of the dispersion D1 is zero, the dispersion slope of the dispersion D2 is also substantially zero.

Namely, the dispersion characteristic of the Fiber Bragg Grating 12 is so decided that if, at any wavelength "λ" in the transmission wavelength band of the optical transmission system, $dD1(\lambda)/d\lambda \neq 0$ is established, then $\{dD1(\lambda)/d\lambda\} \times \{dD2(\lambda)/d\lambda\} < 0$ is also established, and if $dD1(\lambda)/d\lambda = 0$ is established, then $dD2(\lambda)/d\lambda = 0$ is also established, where $dD1(\lambda)$ represents a dispersion generated in an optical signal having a wavelength "λ" during when the optical signal of the wavelength "λ" is transmitted from the transmitting terminal 1a through the transmission line 3 to the receiving terminal 2a, and $dD2(\lambda)$ represents another dispersion given by the Fiber Bragg Grating 12 to the optical signal having the wavelength "λ". If the above conditions defined by the above four equations are satisfied, then this means that if the dispersion D1 generated in the wavelength division multiplexing optical signal 5 during when the wavelength division multiplexing optical signal 5 is transmitted from the transmitting terminal 1a through the transmission line 3 to the receiving terminal 2a takes a maximum value at a wavelength "λ1", then the other dispersion D2 given by the Fiber Bragg Grating 12 to the wavelength division multiplexing optical signal 5 takes a minimum value at or in the vicinity of the same wavelength "λ1".

Since the dispersion characteristics of the Fiber Bragg Grating 12 is decided to satisfy the above-described conditions defined by the four equations, the cost-performance of compensating the dispersion slope of the transmission line 3 is improved.

Figure 3A:
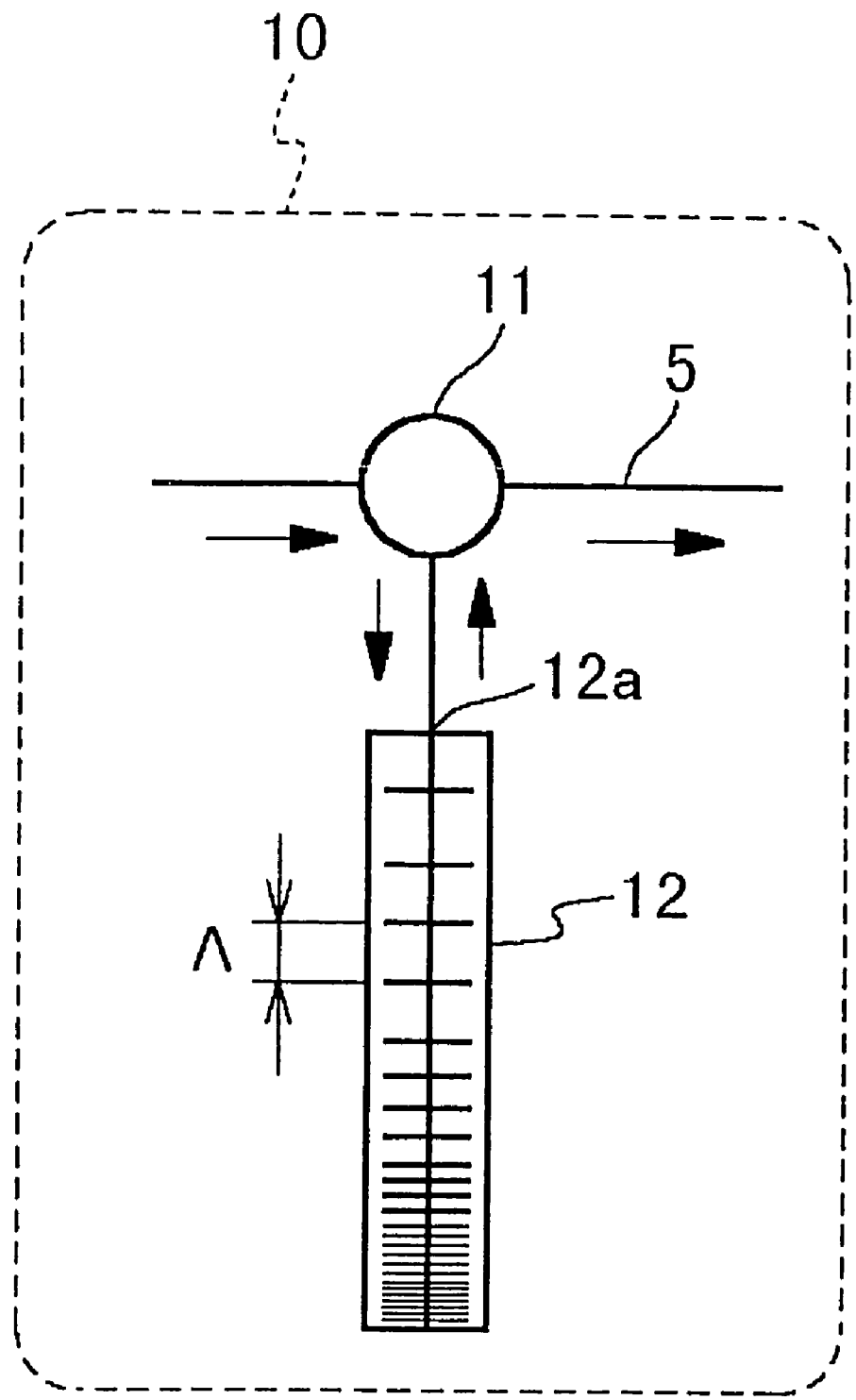
FIG. 3A is a diagram illustrative of the transmission terminal dispersion compensating device included in the optical transmitter included in the optical transmission system of FIG. 1.

FIG. 3A is a diagram illustrative of the transmission terminal dispersion compensating device included in the optical transmitter included in the optical transmission system of FIG. 1. As described above, the optical circulator 11 transfers the wavelength division multiplexing optical signal 5 to the Fiber Bragg Grating 12, so that the Fiber Bragg Grating 12 provides the dispersion D2 to the wavelength division multiplexing optical signal 5 and reflects the dispersion-provided wavelength division multiplexing optical signal 5 to the optical circulator 11. The dispersion-provided wavelength division multiplexing optical signal 5 is transferred through the optical circulator 11 to the transmitting terminal 1a. The Fiber Bragg Grating 12 has a gradation in grating pitch "Λ", wherein the grating pitch becomes decreased as a position becomes distanced from an input output terminal 12a of the Fiber Bragg Grating 12.

Figure 3B:
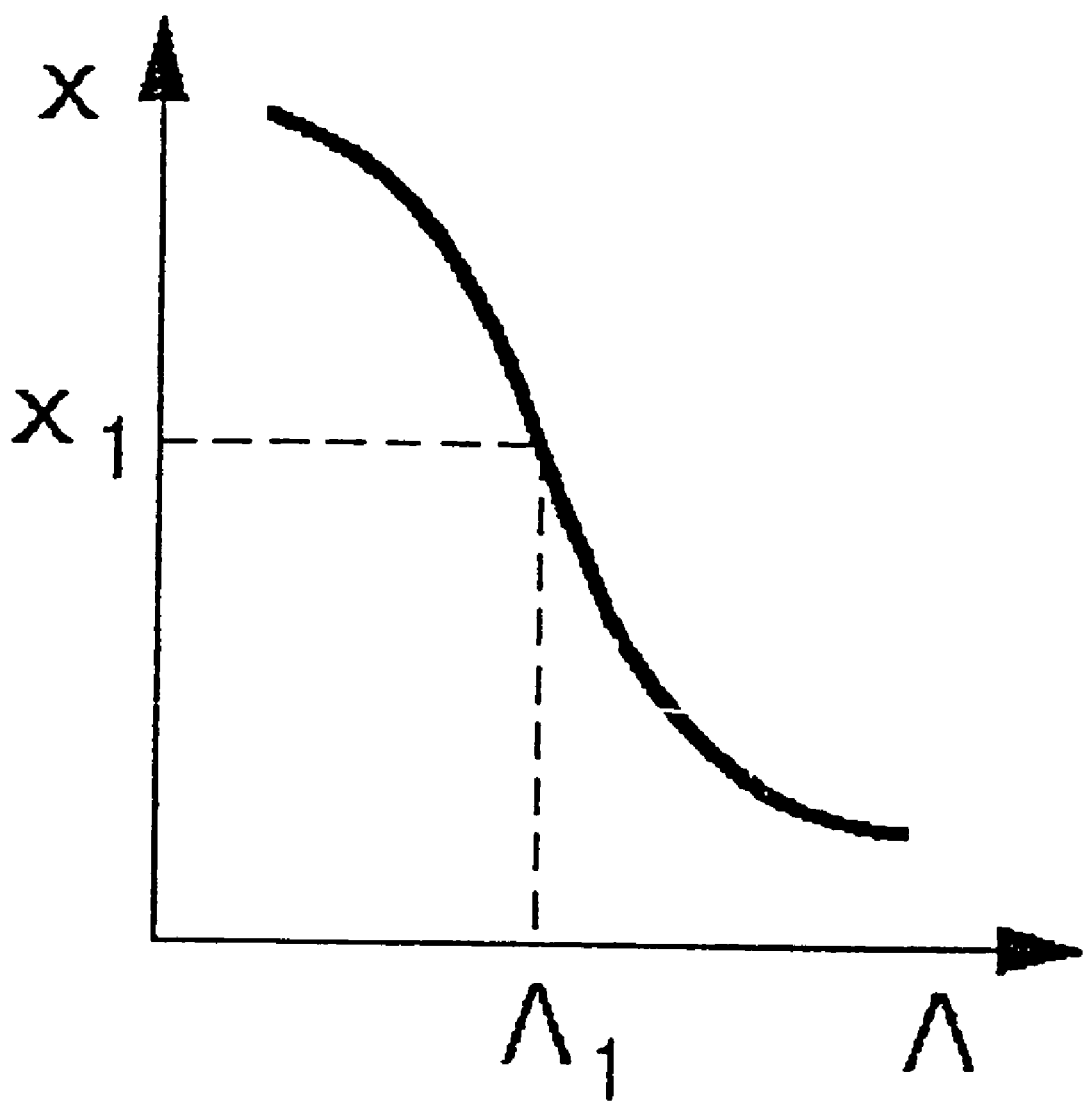
FIG. 3B is a diagram illustrative of a relationship between a grating pitch "$\Lambda$" and a distance "x" from the input output terminal 12a of the Fiber Bragg Grating 12.
Figure 3C:
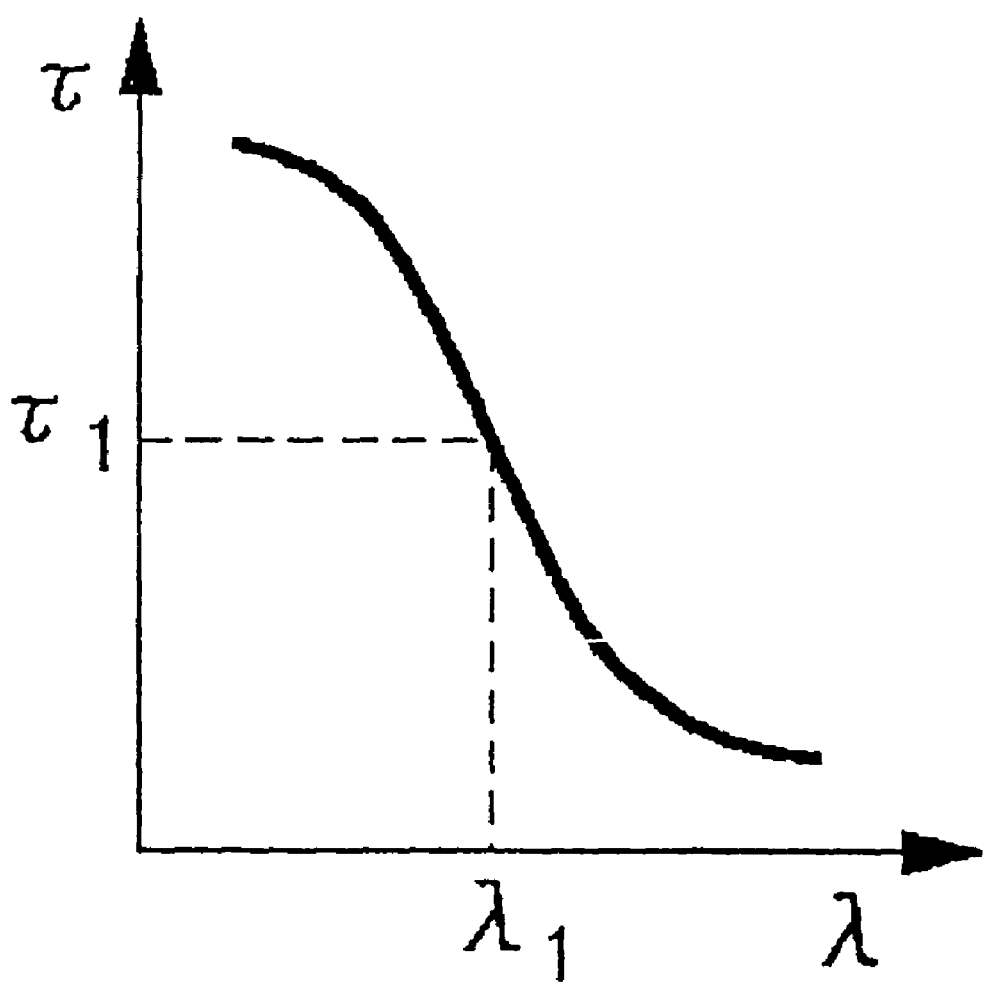
FIG. 3C is a diagram illustrative of a relationship between a delay time "τ" and a wavelength "λ".
Figure 3D:
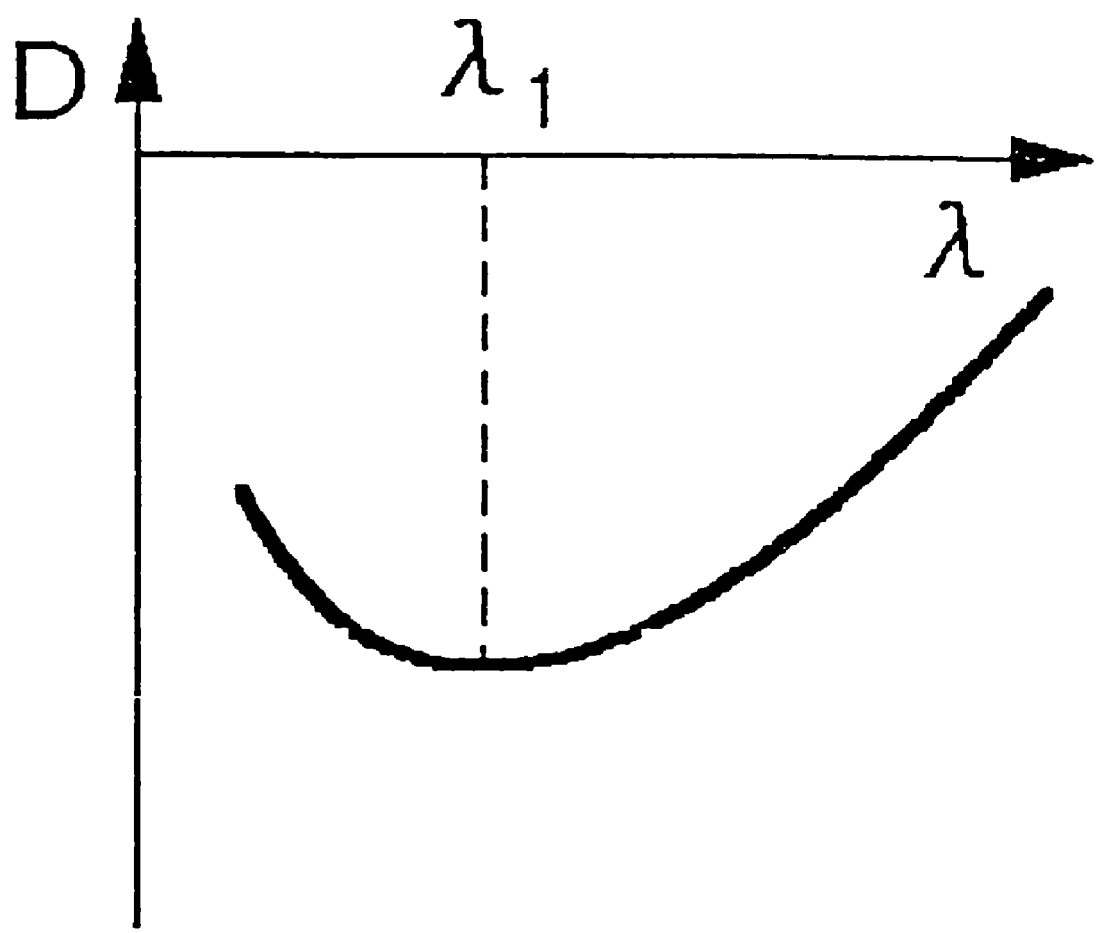
FIG. 3D is a diagram illustrative of a relationship between a dispersion "D" and a wavelength "λ".

FIG. 3B is a diagram illustrative of a relationship between a grating pitch "Λ" and a distance "x" from the input output terminal 12a of the Fiber Bragg Grating 12. FIG. 3C is a diagram illustrative of a relationship between a delay time "τ" and a wavelength "λ". FIG. 3D is a diagram illustrative of a relationship between a dispersion "D" and a wavelength "λ".

As shown in FIG. 3D, the Fiber Bragg Grating 12 has a dispersion characteristic which provides the wavelength division multiplexing optical signal 5 with the dispersion D2 which takes the minimum value at the wavelength "λ1". The Fiber Bragg Grating 12 also has such a gradation in grating pitch "Λ" as being defined by a function x(Λ) shown in FIG. 3B, wherein as the distance "x" from the input output terminal 12a is increased, the grating pitch "Λ" is so decreased as drawing first and second curves which are smoothly and continuously bounded to each other via a point of reverse curve, which is positioned at a critical grating pitch "Λ1". In a first range of the grating pitch "Λ" which is less than the critical grating pitch "Λ1", the gradation of the grating pitch "Λ" is defined by the first curve of the function x(Λ), wherein the first curve is arched upwardly. In a second range of the grating pitch "Λ" which is more than the critical grating pitch "Λ1", the gradation of the grating pitch "Λ" is defined by the second curve of the function x(Λ), wherein the second curve is arched downwardly. Namely, as the distance "x" from the input output point 12a is increased, then the grating pitch "Λ" is decreased along the first curve which is arched upwardly in the first range of the grating pitch "Λ" which is less than the critical grating pitch "Λ1" at the point of reverse curve, and further the grating pitch "Λ" is decreased along the second curve which is arched downwardly in the second range of the grating pitch "Λ" which is greater than the critical grating pitch "Λ1" at the point of reverse curve "x1". What is shown in FIG. 3B and described here means that the critical grating pitch "Λ1" is adjustable so that the Fiber Bragg Grating 12 reflects a light having the wavelength "λ1" at the position "x1" of the critical grating pitch "Λ1", so that the wavelength "λ1", at which the dispersion D2 given by the Fiber Bragg Grating 12 to the wavelength division multiplexing optical signal 5 takes the minimum value, is made correspondent substantially to a wavelength, at which the other dispersion D1 generated in the wavelength division multiplexing optical signal 5 on the transmission through the transmission line 3 takes the maximum value.

The following descriptions will focus onto a mechanism why the above-described adjustment of the grating pitch of the Fiber Bragg Grating 12 allows the Fiber Bragg Grating 12 to have a dispersion characteristic which makes the dispersion D2 take the minimum value at the wavelength "λ1", at which the other dispersion D1 generated in the wavelength division multiplexing optical signal 5 on the transmission through the transmission line 3 takes the maximum value.

The distance "x" from the input output terminal 12a is linear with reference to the delay time "τ". The grating pitch "Λ" is also linear with reference to a wavelength "λ", at which the light is reflected at a position of the grating pitch "Λ". For those reasons, the wavelength-dependency of the delay time "τ" of the Fiber Bragg Grating 12 is, as shown in FIG. 3C, represented by first and second curves which are smoothly and continuously bounded to each other via a point of reverse curve, which is positioned at the wavelength "λ1". In a first range of the wavelength "λ" which is less than the wavelength "λ1", the delay time "τ" of the Fiber Bragg Grating 12 is defined by the first curve of the function τ(λ), wherein the first curve is arched upwardly. In a second range of the wavelength "λ" which is more than the wavelength "λ1", the delay time "τ" of the Fiber Bragg Grating 12 is defined by the second curve of the function τ(λ), wherein the second curve is arched downwardly. Namely, as the wavelength "λ" is increased, then the delay time "τ" of the Fiber Bragg Grating 12 is decreased along the first curve which is arched upwardly in the first range of the wavelength "λ" which is less than the wavelength "λ1" at the point of reverse curve, and further the delay time "τ" of the Fiber Bragg Grating 12 is decreased along the second curve which is arched downwardly in the second range of the wavelength "λ" which is greater than the wavelength "λ1" at the point of reverse curve. Furthermore, the dispersion "D" is given by differentiating the delay time "τ" with the wavelength "λ". As shown in FIG. 3D, as the wavelength "λ" is increased, the wavelength-dependency of the dispersion "D" of the Fiber Bragg Grating 12 is simply deceased in the first range of the wavelength "λ" being less than the wavelength "λ1" and takes the minimum value at the wavelength "λ1" and further simply increased in the second range of the wavelength "λ" being more than the wavelength "λ1".

It is preferable that the dispersion D2(λ) given by the Fiber Bragg Grating 12 to the wavelength division multiplexing optical signal 5 is adjusted so that, at a specific wavelength "λ0" in the transmission wavelength band of the optical transmission system, the transmission characteristic of the transmission line 3 is in the optimized state. The optimized state of the transmission characteristic of the transmission line 3 means that a bit error rate (BER) at the receiving terminal 2a takes a minimum value. The state, that the bit error rate (BER) at the receiving terminal 2a takes the minimum value, is substantially equivalent to a state that an eye aperture degradation of the transmission line 3 takes a minimum value. For this reason, the optimized state of the transmission characteristic of the transmission line 3 means the state that the eye aperture degradation of the transmission line 3 takes the minimum value.

An evaluation in view of the bit error rate (BER) is suitable for evaluating the optical transmission system by an input-output test. Another evaluation in view of the eye aperture degradation is suitable for evaluating the optical transmission system by simulation. If the dispersion characteristic of the Fiber Bragg Grating 12 is adjusted depending upon selecting the actual Fiber Bragg Grating 12, it is preferable to select the Fiber Bragg Grating 12, so that the bit error rate (BER) takes the minimum value at the specific wavelength "λ0". If the dispersion characteristic of the Fiber Bragg Grating 12 is adjusted depending upon the simulation, it is preferable to decide the dispersion characteristic of the Fiber Bragg Grating 12, so that the eye aperture degradation of the transmission line 3 takes the minimum value at the specific wavelength "λ0".

It is preferable that the dispersion D2(λ) given by the Fiber Bragg Grating 12 to the component of the wavelength (λ) included in the wavelength division multiplexing optical signal 5 corresponds to a sum of a dispersion D2(λ0) and a correction term. The dispersion D2(λ0) is a dispersion given by the Fiber Bragg Grating 12 to the component of the specific wavelength (λ0) included in the wavelength division multiplexing optical signal 5. The correction term corresponds to 40%–60% of a difference or subtraction of an averaged dispersion value of the transmission line 3 at the wavelength "λ" from another averaged dispersion value of the transmission line 3 at the specific wavelength "λ0". The bit error rate (BER) or the eye aperture degradation of the transmission line 3 takes the minimum value at the specific wavelength "λ0". It is, therefore, preferable that the dispersion D2(λ) given by the Fiber Bragg Grating 12 to the wavelength division multiplexing optical signal 5 is decided to satisfy the following equation:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

It should be noted that, in accordance with this embodiment of the present invention, how to decide the dispersion D2(λ) given by the Fiber Bragg Grating 12 to the wavelength division multiplexing optical signal 5 is not intended to forcibly cause that the sum of the dispersion D2(λ) and the other dispersion D1(λ) becomes zero. As disclosed in Japanese laid-open patent publication No. 2001-197003, it is theoretically possible to realize the dispersion compensating device which is capable of causing that the sum of the dispersion D2(λ) and the other dispersion D1(λ) becomes zero throughout the full transmission wavelength band. Notwithstanding, the realization of such ideal dispersion compensating device which is capable of causing that the sum of the dispersion D2(λ) and the other dispersion D1(λ) becomes zero throughout the full transmission wavelength band would be unavailable practically in view of the present technical level of the fiber fabrication and the cost-performance.

In case that the dispersion compensation is made by the optical transmitter 1, the bit error rate (BER) and the eye aperture degradation do not become minimum due to a non-linearity of the characteristic of the dispersion-managed fiber (DMF) 7, even if the sum of the dispersion D1 and the dispersion D2 becomes zero.

Figure 5:
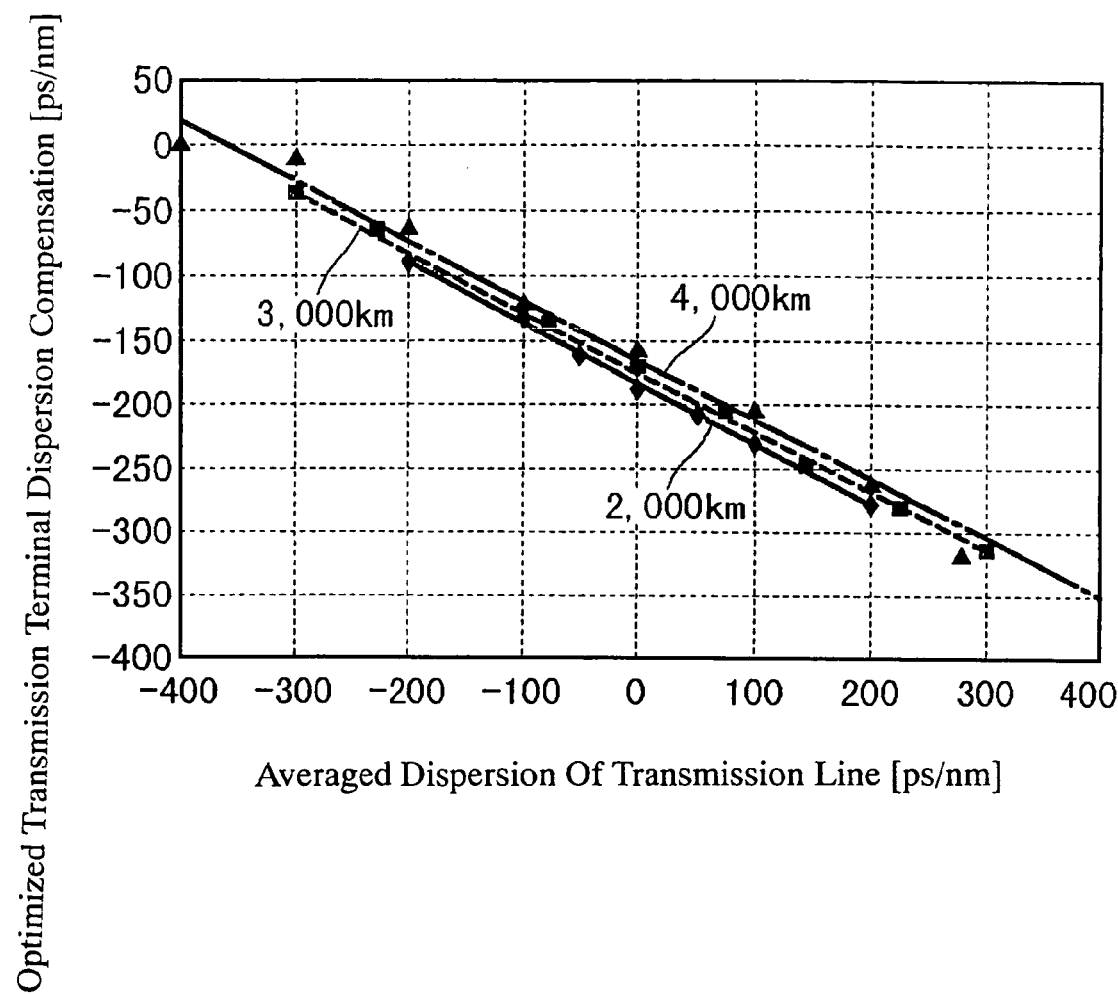
FIG. 5 is a diagram illustrative of a dependency of an optimum transmission terminal dispersion compensation upon an averaged dispersion value of a transmission line.

FIG. 5 is a diagram illustrative of a dependency of an optimum transmission terminal dispersion compensation upon an averaged dispersion value of a transmission line. The optimum transmission terminal dispersion compensation is defined to be a dispersion compensation made by the Fiber Bragg Grating 12 to cause that the eye aperture degradation of the transmission line 3 becomes minimum. FIG. 5 shows that the dependency of the optimum transmission terminal dispersion compensation upon the averaged dispersion value of the transmission line 3 in three cases of different transmission distances of 2000 kin, 3000 km and 4000 km through the transmission line 3. Respective values of the optimum transmission terminal dispersion compensation were calculated depending upon the simulation. Independent from the transmission distances, the respective optimum transmission terminal dispersion compensations are generally given by linear functions of the averaged dispersion value of the transmission line 3, wherein the respective linear functions have a gradient of approximately −0.48. Further, as the averaged dispersion value of the transmission line 3 is zero, the optimum transmission terminal dispersion compensation is not zero. This demonstrates that, in view of reducing or suppressing the bit error rate (BER) and the eye aperture degradation, it is not preferable that the sum of the dispersion D1(λ) generated in the wavelength division multiplexing optical signal 5 being on the transmission through the transmission line 3 and the dispersion D2(λ) given by the Fiber Bragg Grating 12 to the wavelength division multiplexing optical signal 5 becomes zero. For example, in case of the transmission distance of 3000 km of the transmission line 3, when the dispersion D2(λ) given by the Fiber Bragg Grating 12 to the wavelength division multiplexing optical signal 5 is 150 ps/nm, then the optimum transmission terminal dispersion compensation is −246 ps/nm.

In accordance with this embodiment of the present invention, in order to improve the cost-performance of the compensation to the dispersion slope, the dispersion D2(λ) given by the Fiber Bragg Grating to the wavelength division multiplexing optical signal 5 is so decided as to satisfy the conditions that if, at any wavelength "λ" in the transmission wavelength band of the optical transmission system, $dD1(\lambda)/d\lambda \neq 0$ is established, then $\{dD1(\lambda)/d\lambda\} \times \{dD2(\lambda)/d\lambda\} < 0$ is also established, and if $dD1(\lambda)/d\lambda = 0$ is established, then $dD2(\lambda)/d\lambda 0$ is also established, where $dD1(\lambda)$ represents a dispersion generated in an optical signal having a wavelength "λ" during when the optical signal of the wavelength "λ" is transmitted from the transmitting terminal 1a through the transmission line 3 to the receiving terminal 2a, and $dD2(\lambda)$ represents another dispersion given by the Fiber Bragg Grating 12 to the optical signal having the wavelength "λ".

In view of improving the cost-performance and the transmission characteristic of the transmission line 3, it is preferable that the dispersion $D2(\lambda)$ given by the Fiber Bragg Grating 12 to the wavelength division multiplexing optical signal 5 is so adjusted that the transmission characteristic of the transmission line 3 is in the optimized state at the specific wavelength "λ0" included in the transmission wavelength band of the optical transmission system, and also preferable that the dispersion $D2(\lambda)$ is so decided as to satisfy the following equation:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

The above description that "It should be noted that, in accordance with this embodiment of the present invention, how to decide the dispersion $D2(\lambda)$ given by the Fiber Bragg Grating 12 to the wavelength division multiplexing optical signal 5 is not intended to forcibly cause that the sum of the dispersion $D2(\lambda)$ and the other dispersion $D1(\lambda)$ becomes zero." does not mean that the compensation to the dispersion is not made by the optical receiver 2. In accordance with this embodiment of the present invention, the compensation to the dispersion is made by the optical receiver 2 for reducing, as closely to zero as possible, the total dispersion possessed by the wavelength division multiplexing optical signal 5.

Figure 4:
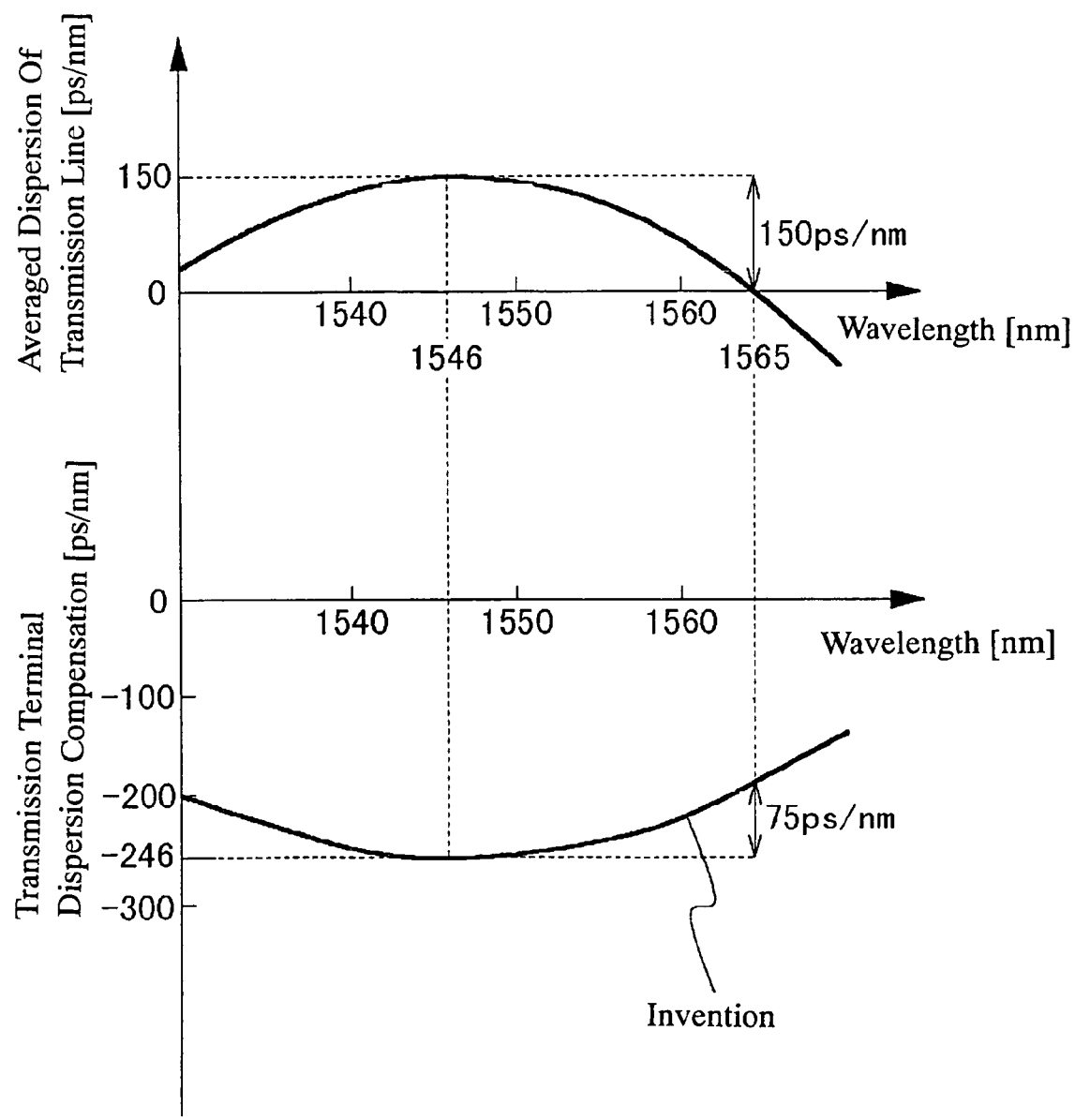
FIG. 4 is a diagram illustrative of a wavelength-dependency of an averaged dispersion value of a transmission line and another wavelength-dependency of an transmission terminal dispersion compensation.

FIG. 4 is a diagram illustrative of a wavelength-dependency of an averaged dispersion value of a transmission line and another wavelength-dependency of an transmission terminal dispersion compensation. The dispersion $D1(\lambda)$ generated in the wavelength division multiplexing optical signal 5 being on the transmission through the transmission line 3 takes the maximum value of 150 ps/nm at a wavelength "λ1" of 1546 nm. In response to the dispersion $D1(\lambda)$, the dispersion characteristic of the Fiber Bragg Grating 12 is so decided as to take the minimum value at the wavelength "λ1" of 1546 nm.

The dispersion characteristic of the Fiber Bragg Grating 12 is so decided that the eye aperture degradation of the wavelength division multiplexing optical signal 5 at the receiving terminal 2a takes a minimum value at a wavelength "λ0" of 1546 nm. At the wavelength "λ0" of 1546 nm, the dispersion $D1(\lambda 0)$ generated in the wavelength division multiplexing optical signal 5 being on the transmission through the transmission line 3 is 150 ps/nm. With reference again to FIG. 5, in case that the transmission distance of 3000 km, if the dispersion D1 generated in the wavelength division multiplexing optical signal 5 being on the transmission through the transmission line 3 is 150 ps/nm, then such the dispersion compensation of the Fiber Bragg Grating 12 as to make minimum the eye aperture degradation of the wavelength division multiplexing optical signal 5 at the receiving terminal 2a is −246 ps/nm. For this reason, the dispersion characteristic of the Fiber Bragg Grating 12 is so decided that the dispersion $D2(\lambda 0)$ given by the Fiber Bragg Grating 12 to the wavelength division multiplexing optical signal 5 becomes −246 ps/nm at the wavelength "λ0" of 1546 nm, for example, to satisfy $D2(\lambda 0) = -246$ ps/nm.

In accordance with the example shown in FIG. 4, the dispersion characteristic of the Fiber Bragg Grating 12 is so decided that the wavelength "λ0", at which the eye aperture degradation of the transmission line 3 becomes minimum, is 1546 nm which corresponds to the wavelength "λ1", at which the dispersion D2 given by the Fiber Bragg Grating 12 takes the minimum value. Notwithstanding, it is not essential that the wavelength "λ0" is identical with the wavelength "λ1".

Further, the dispersion $D2(\lambda)$ given by the Fiber Bragg Grating 12 is so decided as to satisfy the following equation:

$$D2(\lambda)=D2(\lambda 0)+0.5\{D1(\lambda 0)-D1(\lambda)\}.$$

where $D2(\lambda 0)$ is the dispersion given by the Fiber Bragg Grating 12 at the wavelength "λ0" of 1546 nm.

For example, a dispersion D2 (λt) given by the Fiber Bragg Grating 12 at a wavelength "λt" of 1576 nm will hereby be considered.

If $D2(\lambda 0) = -246$ ps/nm;

$D1(\lambda 0) = 150$ ps/nm; and $D1(\lambda t) = 0$ ps/nm, then $D2(\lambda t) = D2(\lambda 0) + 0.5\{D1(\lambda 0) - D1(\lambda)\}$ $= -246$ ps/nm $+ 0.5(150$ ps/nm $- 0$ ps/nm$)$ $= -246$ ps/nm $+ 75$ ps/nm $= -171$ ps/nm.

The dispersion $D2(\lambda t)$ satisfies the following equation:

$$D2(\lambda 0)+0.4\{D1(\lambda 0)-D1(\lambda)\} \leq D2(\lambda) \leq D2(\lambda 0)+0.6\{D1(\lambda 0)-D1(\lambda)\}.$$

Figure 6:
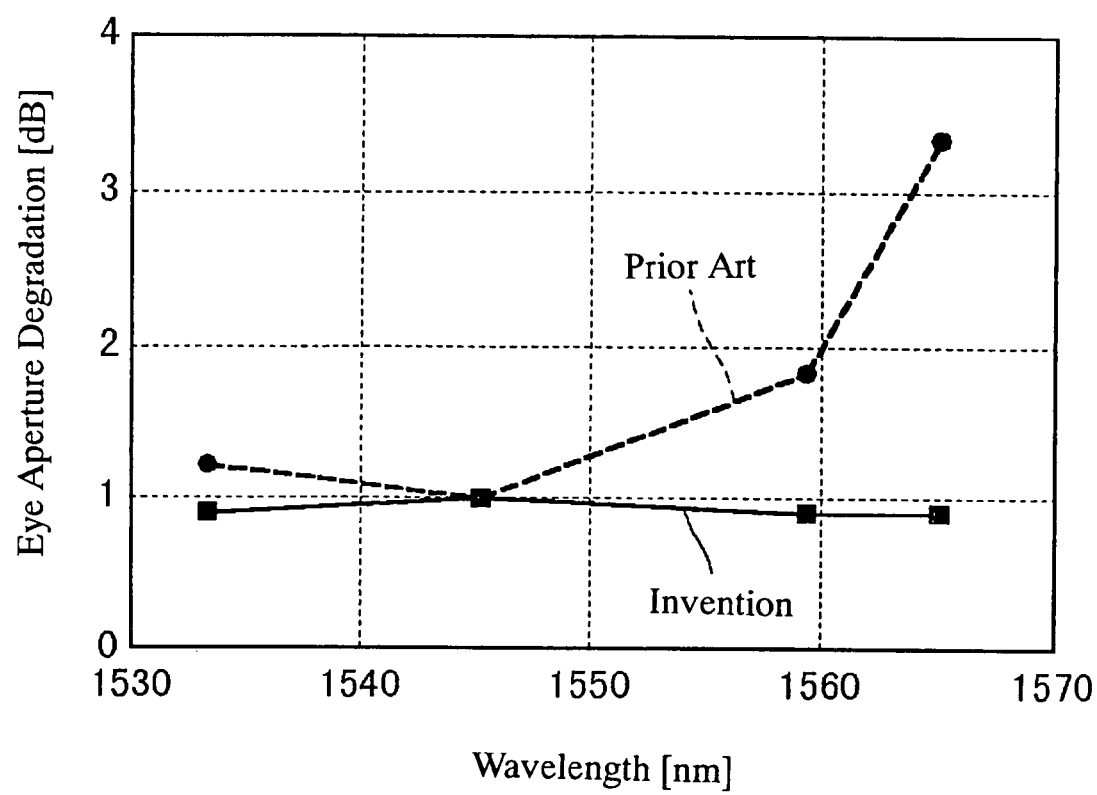
FIG 6 is a diagram illustrative of a wavelength-dependency of an eye aperture degradation of the wavelength division multiplexing optical signal at the receiving terminal of the transmission line.

FIG. 6 is a diagram illustrative of a wavelength-dependency of the eye aperture degradation of the wavelength division multiplexing optical signal 5 at the receiving terminal 2a of the transmission line 3, wherein the dispersion $D2(\lambda)$ given by the Fiber Bragg Grating 12 to the wavelength division multiplexing optical signal 5 would satisfy the equation: $D2(\lambda)=D2(\lambda 0)+0.5\{D1(\lambda 0)-D1(\lambda)\}$, provided that only the eye aperture degradation at a wavelength included in the transmission wavelength band of the optical transmission system is shown. A real line represents the eye aperture degradation of the present invention, while a broken line represents the eye aperture degradation of the prior arts disclosed in the above-described three literatures under conditions that the dispersion compensation at the wavelength "λ0" of 1546 nm is −246 ps/nm, at which the eye aperture degradation becomes minimum.

As represented by the real line in FIG. 6, since the dispersion $D2(\lambda)$ is decided in accordance with the equation: $D2(\lambda)=D2(\lambda 0)+0.5\{D1(\lambda 0)-D1(\lambda)\}$, the eye aperture degradation of the wavelength division multiplexing optical signal 5 at the receiving terminal 2a may be well suppressed in the full transmission wavelength band.

As represented by the broken line in FIG. 6, as the wavelength is increased far from the wavelength "λ0" of 1546 nm, the eye aperture degradation is rapidly increased and the optimum compensation to the dispersion is no longer made.

As described above, the optical transmission system of this embodiment of the present invention allows the desired application of the polarization interleaving multiplexing technique and is capable of an appropriate compensation to the dispersion to obtain the desired transmission characteristic and also capable of reducing the cost.

In accordance with this embodiment of the present invention, the transmission line 3 comprises a transmission line which has the dispersion characteristic with a wavelength-dependency which is represented by the first type curve being arched upwardly. Notwithstanding, it is possible that the transmission line 3 comprises another transmission line which has the other dispersion characteristic with the other wavelength-dependency. Even if the transmission line 3 has a different dispersion characteristic with the other wavelength-dependency than the wavelength-dependency which is represented by the first type curve being arched upwardly, then the dispersion characteristic of the Fiber Bragg Grating 12 is so decided that, over the full transmission wavelength band of this optical transmission system, a sign of a dispersion slope of the dispersion D2 given by the Fiber Bragg Grating 12 to the wavelength division multiplexing optical signal 5 is opposite to a sign of another dispersion slope of the dispersion D1 generated in the wavelength division multiplexing optical signal 5 during when the wavelength division multiplexing optical signal 5 is transmitted from the transmitting terminal 1a through the transmission line 3 to the receiving terminal 2a, provided that, at a wavelength where the dispersion slope of the dispersion D1 is zero, the dispersion slope of the dispersion D2 is also substantially zero.

Figure 7:
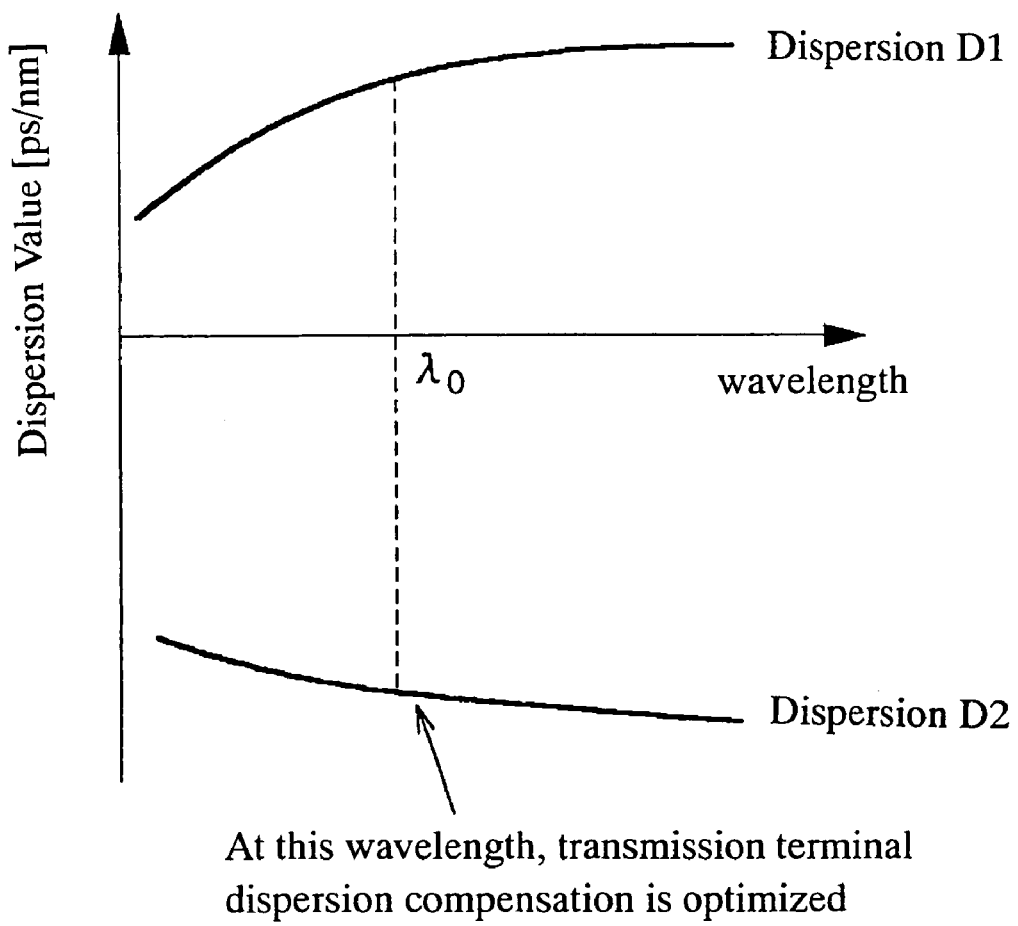
FIG. 7 is a diagram illustrative of a wavelength-dependency of the averaged dispersion value of the transmission line 3 and another wavelength-dependency of the dispersion value of the Fiber Bragg Grating 12 in another case in accordance with the embodiment of the present invention.

FIG. 7 is a diagram illustrative of a wavelength-dependency of the averaged dispersion value of the transmission line 3 and another wavelength-dependency of the dispersion value of the Fiber Bragg Grating in another case in accordance with the embodiment of the present invention. As shown in FIG. 7, the dispersion characteristic of the Fiber Bragg Grating 12 is so decided that if the averaged value of the dispersion D1 of the transmission line 3 is simply increased by increasing the wavelength or if the sign of the dispersion slope of the dispersion D1 of the transmission line 3 is positive over the full transmission wavelength band of this optical transmission system, then the dispersion D2 of the Fiber Bragg Grating 12 is simply decreased and the sign of the dispersion slope of the dispersion D2 of the Fiber Bragg Grating 12 is negative.

Figure 8:
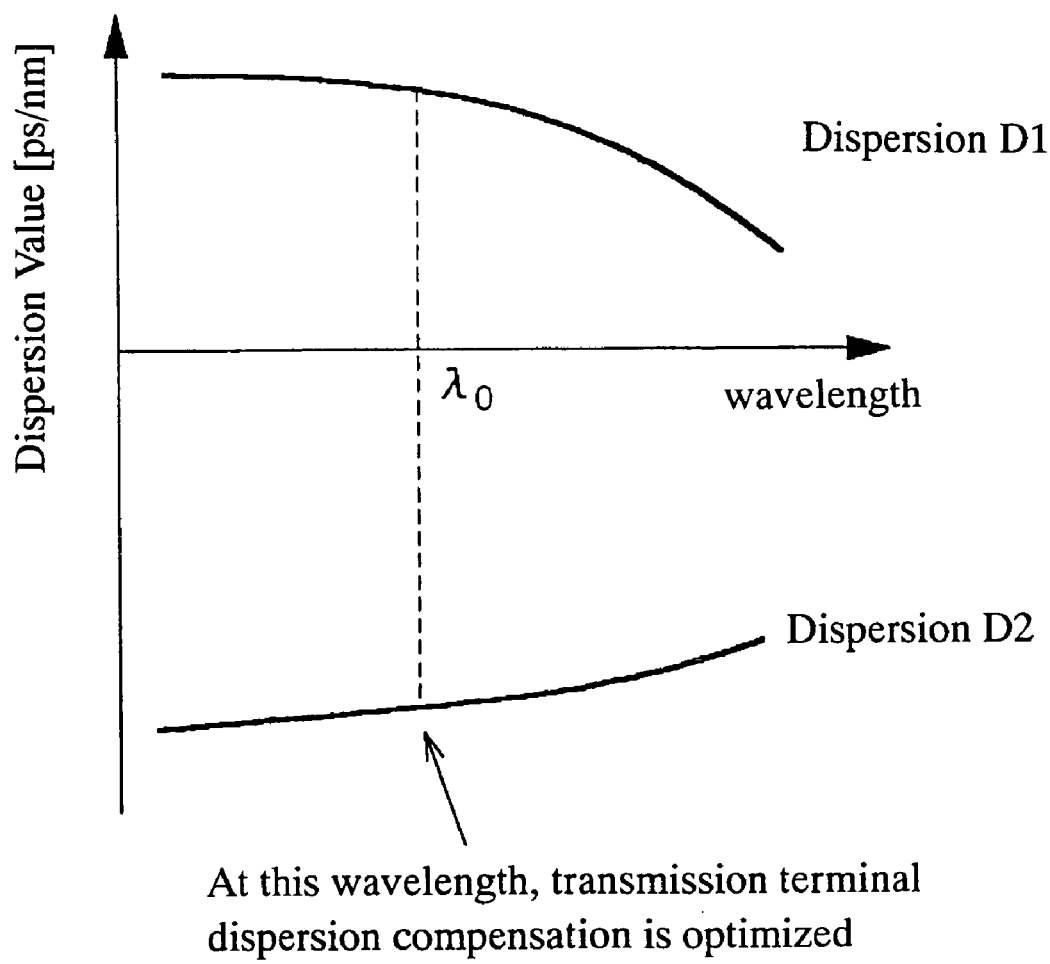
FIG. 8 is a diagram illustrative of a wavelength-dependency of the averaged dispersion value of the transmission line 3 and another wavelength-dependency of the dispersion value of the Fiber Bragg Grating 12 in still another case in accordance with the embodiment of the present invention.

FIG. 8 is a diagram illustrative of a wavelength-dependency of the averaged dispersion value of the transmission line 3 and another wavelength-dependency of the dispersion value of the Fiber Bragg Grating 12 in still another case in accordance with the embodiment of the present invention. As shown in FIG. 8, the dispersion characteristic of the Fiber Bragg Grating 12 is so decided that if the averaged value of the dispersion D1 of the transmission line 3 is simply decreased by increasing the wavelength or if the sign of the dispersion slope of the dispersion D1 of the transmission line 3 is negative over the full transmission wavelength band of this optical transmission system, then the dispersion D2 of the Fiber Bragg Grating 12 is simply increased and the sign of the dispersion slope of the dispersion D2 of the Fiber Bragg Grating 12 is positive.

Figure 9:
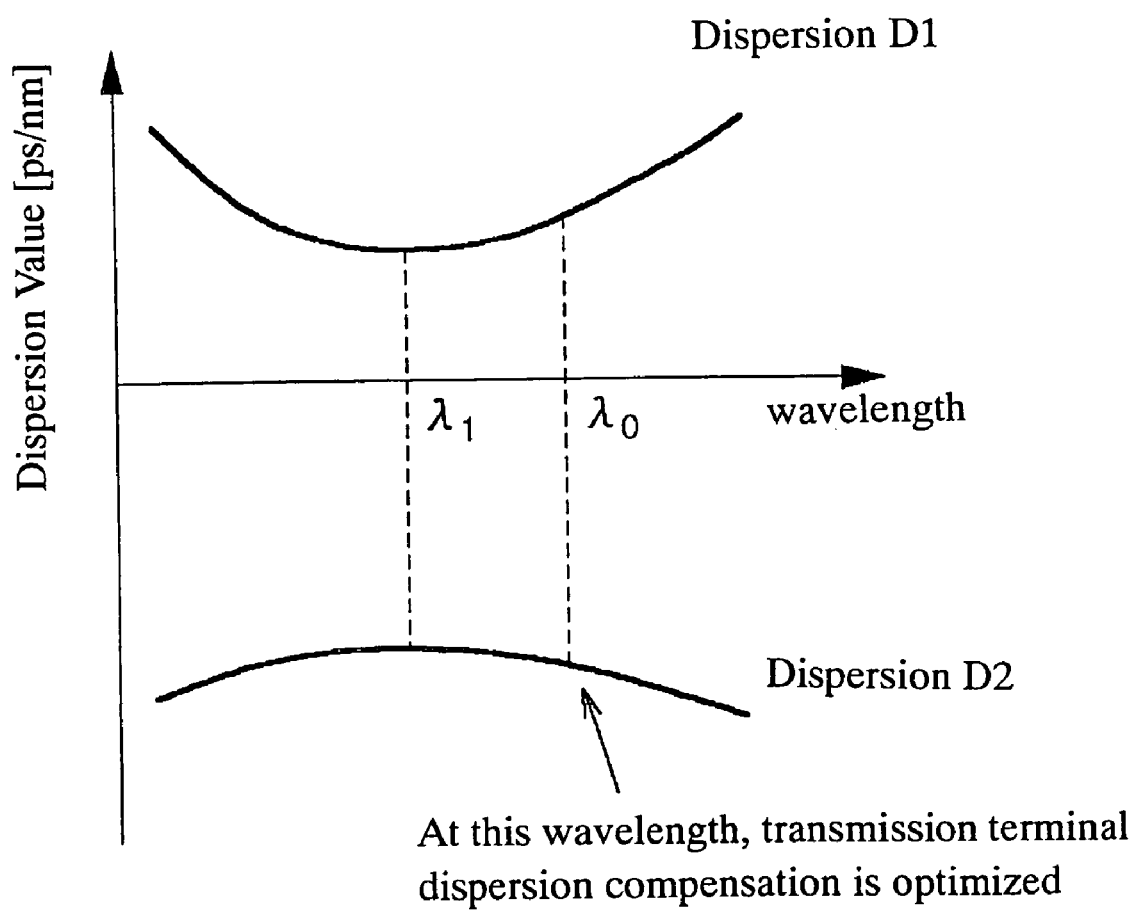
FIG. 9 is a diagram illustrative of a wavelength-dependency of the averaged dispersion value of the transmission line 3 and another wavelength-dependency of the dispersion value of the Fiber Bragg Grating 12 in still another case in accordance with the embodiment of the present invention.

FIG. 9 is a diagram illustrative of a wavelength-dependency of the averaged dispersion value of the transmission line 3 and another wavelength-dependency of the dispersion value of the Fiber Bragg Grating 12 in still another case in accordance with the embodiment of the present invention. As shown in FIG. 9, the dispersion characteristic of the Fiber Bragg Grating 12 is so decided that if the dispersion D1 of the transmission line 3 has a wavelength-dependency being represented by a curve being arched downwardly and taking the minimum value at the specific wavelength "$\lambda 1$", then the dispersion D2 of the Fiber Bragg Grating 12 has a different wavelength-dependency being represented by a different curve being arched upwardly and taking the maximum value at the specific wavelength "$\lambda 1$". In this case, the dispersion characteristic of the Fiber Bragg Grating 12 is also so decided that over the full transmission wavelength band of this optical transmission system, a sign of a dispersion slope of the dispersion D2 given by the Fiber Bragg Grating 12 to the wavelength division multiplexing optical signal 5 is opposite to a sign of another dispersion slope of the dispersion D1 generated in the wavelength division multiplexing optical signal 5 during when the wavelength division multiplexing optical signal 5 is transmitted from the transmitting terminal 1a through the transmission line 3 to the receiving terminal 2a, provided that, at a wavelength where the dispersion slope of the dispersion D1 is zero, the dispersion slope of the dispersion D2 is also substantially zero.

It is preferable that the dispersion $D2(\lambda)$ given by the Fiber Bragg Grating 12 to the wavelength division multiplexing optical signal 5 is so adjusted that the transmission characteristic of the transmission line 3 becomes the optimized state at the specific wavelength "$\lambda 0$" included in the transmission wavelength band of the optical transmission system, in any cases that the dispersion D1 of the transmission line has any wavelength-dependency. As described above, the optimized state of the transmission characteristic of the transmission line 3 means that a bit error rate (BER) at the receiving terminal 2a takes a minimum value. The state, that the bit error rate (BER) at the receiving terminal 2a takes the minimum value, is substantially equivalent to a state that an eye aperture degradation of the transmission line 3 takes a minimum value. For this reason, the optimized state of the transmission characteristic of the transmission line 3 means the state that the eye aperture degradation of the transmission line 3 takes the minimum value. In this case, it is preferable that the dispersion $D2(\lambda)$ given by the Fiber Bragg Grating 12 to the component of the wavelength "$\lambda$" included in the wavelength division multiplexing optical signal 5 is so decided as to satisfy the following equation:

$$D2(\lambda 0)+0.4\{D1(\lambda 0)-D1(\lambda)\}=D2(\lambda)\leq D2(\lambda 0)+0.6\{D1(\lambda 0)-D1(\lambda)\}.$$

Figure 10:
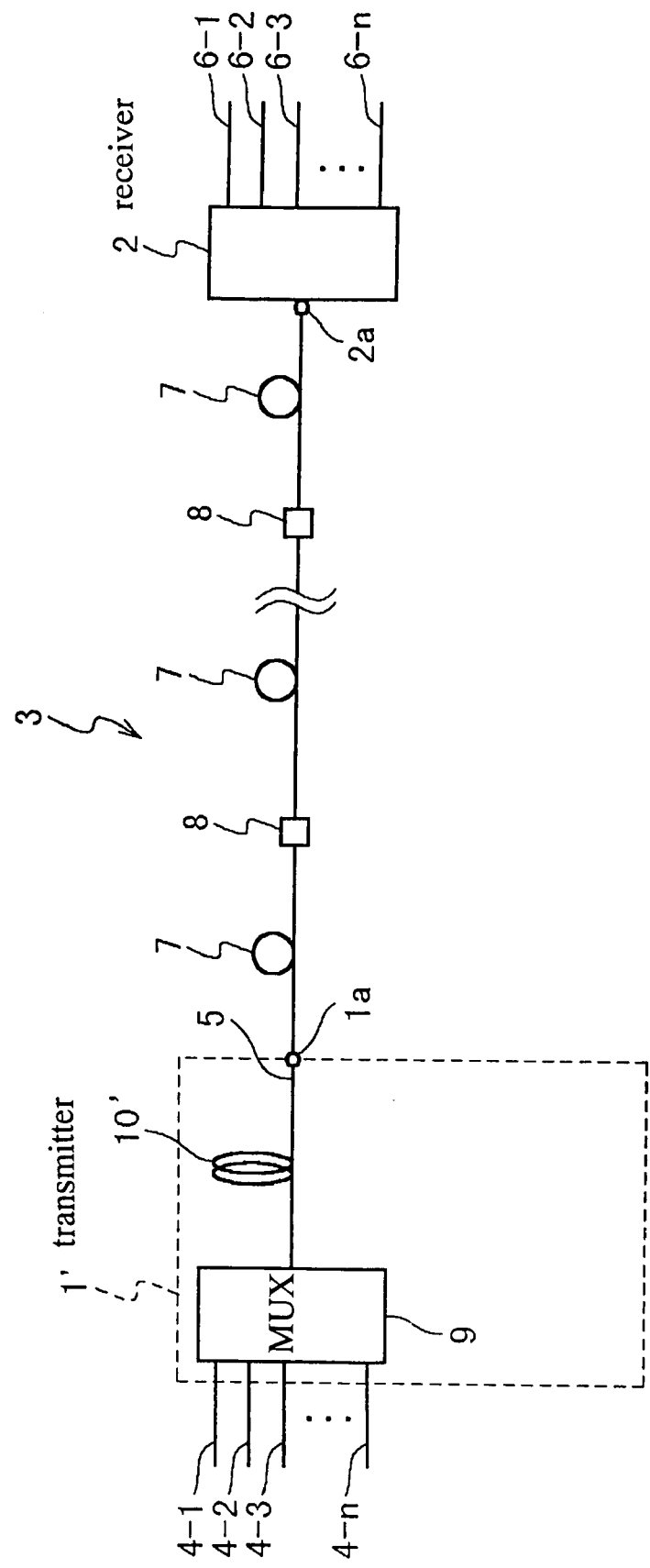
FIG. 10 is a diagram illustrative of another novel optical transmission system in a modified embodiment of the present invention.

FIG. 10 is a diagram illustrative of another novel optical transmission system in a modified embodiment of the present invention. In the above-described embodiment, the optical transmitter 1 includes the optical multiplexer 9 and the transmission terminal dispersion compensating device 10 which further includes the optical circulator 11 and the Fiber Bragg Grating 12. In accordance with this modified embodiment of the present invention, the optical transmitter 1 includes the optical multiplexer 9 and a dispersion compensation fiber 10' which has the same dispersion characteristic as the Fiber Bragg Grating 12. Namely, the optical transmitter 1 may be modified to include the optical multiplexer 9 and another dispersion compensation device which has the same dispersion characteristic as the Fiber Bragg Grating 12.

As described above, the present invention provides the novel wavelength division multiplexing optical transmission system capable of performing the appropriate compensation to the dispersion of the optical signal for reducing the bit error rate and improving the transmission characteristics such as the eye aperture degradation at a reduced cost.

The present invention also provides the novel wavelength division multiplexing optical transmission system allowing both the application of the polarization interleaving multiplexing technique and the appropriate compensation to the dispersion of the optical signal for realizing the improved transmission characteristics at a reduced cost.

The present invention also provide the novel optical communication method capable of performing the appropriate compensation to the dispersion of the optical signal for reducing the bit error rate and improving transmission characteristics such as the eye aperture degradation at a reduced cost.

The present invention further provides the novel optical communication method allowing both the application of the polarization interleaving multiplexing technique and the appropriate compensation to the dispersion of the optical signal for realizing improved transmission characteristics at a reduced cost.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A wavelength-division multiplexing optical transmission system including:
   an optical multiplexer for multiplexing plural optical input signals having wavelengths included in a predetermined transmission wavelength band and generating a wavelength-division multiplexing optical signal;
   a dispersion-compensating device for performing a dispersion compensation to said wavelength-division multiplexing optical signal;
   an optical transmission path for transmitting said wavelength-division multiplexing optical signal from a transmitter terminal to a receiver terminal; and
   an optical receiver for receiving said wavelength-division multiplexing optical signal transmitted through said optical transmission path,
   wherein said dispersion-compensating device provides a compensating-purpose dispersion D2 to said wavelength-division multiplexing optical signal, and
   wherein said compensating-purpose dispersion D2 satisfies conditions that at any wavelength "$\lambda$" included in said transmission wavelength band, if $dD1(\lambda)/d\lambda \neq 0$ and not infinite is established, then $\{dD1(\lambda)/d\lambda\} \times \{dD2(\lambda)/d\lambda \neq 0\} < 0$ is also established, and if $dD1(\lambda)/d\lambda \neq 0$ is established, then $dD2(\lambda)/d\lambda = 0$ is also established, where D1 represents a dispersion generated in said wavelength-division multiplexing optical signal during when said wavelength-division multiplexing optical signal is transmitted through said transmission path from said transmitter terminal to said receiver terminal.

2. The wavelength-division multiplexing optical transmission system as claimed in claim 1, wherein dispersion D1 generated in said wavelength division multiplexing optical signal during when said wavelength division multiplexing optical signal is transmitted through said transmission path from said transmitter terminal to said receiver terminal becomes maximum at a specific wavelength "$\lambda 1$", and wherein said compensating-purpose dispersion D2 becomes minimum at said specific wavelength "$\lambda 1$".

3. The wavelength-division multiplexing optical transmission system as claimed in claim 1, wherein a dispersion D1 generated in said wavelength division multiplexing optical signal during when said wavelength division multiplexing optical signal is transmitted through said transmission path from said transmitter terminal to said receiver terminal becomes minimum at a specific wavelength "$\lambda 1$", and wherein said compensating-purpose dispersion D2 becomes maximum at said specific wavelength "$\lambda 1$".

4. The wavelength-division multiplexing optical transmission system as claimed in claim 1, wherein a dispersion D1 generated in said wavelength division multiplexing optical signal during when said wavelength division multiplexing optical signal is transmitted through said transmission path from said transmitter terminal to said receiver terminal is simply increased by increasing wavelength, and wherein said compensating-purpose dispersion D2 is simply decreased by increasing wavelength.

5. The wavelength-division multiplexing optical transmission system as claimed in claim 1, wherein a dispersion D1 generated in said wavelength division multiplexing optical signal during when said wavelength division multiplexing optical signal is transmitted through said transmission path from said transmitter terminal to said receiver terminal is simply decreased by increasing wavelength, and wherein said compensating-purpose dispersion D2 is simply increased by increasing wavelength.

6. The wavelength-division multiplexing optical transmission system as claimed in claim 1, wherein said compensating-purpose dispersion D2 is decided so that a sum of said dispersion D1 and said compensating-purpose dispersion D2 is not zero.

7. The wavelength-division multiplexing optical transmission system as claimed in claim 1, wherein said compensating-purpose dispersion D2 is decided so that a bit error rate of said wavelength division multiplexing optical signal at said receiver terminal becomes minimum at a predetermined wavelength "$\lambda D$" included in said transmission wavelength band.

8. The wavelength-division multiplexing optical transmission system as claimed in claim 7, wherein, at any wavelength "$\lambda$", said compensating-purpose dispersion D2 satisfies an equation given by: $D2(\lambda 0)+0.4\{D1(\lambda 0)-D1(\lambda)\} \leq D2(\lambda) \leq D2(\lambda 0)+0.6\{D1(\lambda 0)-D1(\lambda)\}$.

9. The wavelength-division multiplexing optical transmission system as claimed in claim 1, wherein said compensating-purpose dispersion D2 is decided so that an eye aperture degradation of said wavelength division multiplexing optical signal at said receiver terminal becomes minimum at a predetermined wavelength "$\lambda 0$" included in said transmission wavelength band.

10. The wavelength-division multiplexing optical transmission system as claimed in claim 9, wherein, at any wavelength "$\lambda$", said compensating-purpose dispersion D2 satisfies an equation given by: $D2(\lambda 0)+0.4\{D1(\lambda 0)-D1(\lambda)\} \leq D2(\lambda) \leq D2(\lambda 0)+0.6\{D1(\lambda 0)-D1(\lambda)\}$.

11. The wavelength-division multiplexing optical transmission system as claimed in claim 1, wherein said dispersion-compensating device further includes: an optical circulator coupled between said optical multiplexer and said transmitter terminal; and a fiber Bragg grating coupled to said optical circulator for receiving said wavelength-division multiplexing optical signal through said optical circulator from said optical multiplexer and performing said dispersion compensation to said wavelength-division multiplexing optical signal, and said fiber Bragg grating has a variation in a grating pitch $\Lambda$ which is represented by first and second grating pitch functions Λ1(x) and Λ2(x) smoothly and continuously bounded to each other via a reverse curve point, at which said grating pit Λ is equal to a critical grating pitch Λ1, and said first grating pitch function Λ1(x) is represented by a first curve being arched upwardly in a first grating pitch range where said grating pitch Λ is smaller than said critical grating pitch Λ1, while said second grating pitch function Λ2(x) is represented by a second curve being arched downwardly in a second grating pitch range where said grating pitch Λ is larger than said critical grating pitch Λ1.

12. A wavelength-division multiplexing optical transmission system including:
   an optical multiplexer for multiplexing plural optical input signals having wavelengths included in a predetermined transmission wavelength band and generating wavelength-division multiplexing optical signal;
   a dispersion-compensating device including a grating, for performing a dispersion compensation to said wavelength-division multiplexing optical signal;
   an optical transmission path for transmitting said wavelength-division multiplexing optical signal from a transmitter terminal to a receiver terminal; and
   an optical receiver for receiving said wavelength-division multiplexing optical signal transmitted through said optical transmission path,
   wherein said dispersion-compensating device provides a compensating-purpose dispersion D2 to said wavelength-division multiplexing optical signal,
   wherein a dispersion D1 generated in said wavelength division multiplexing optical signal during when said wavelength division multiplexing optical signal is transmitted through said transmission path from said transmitter terminal to said receiver terminal becomes maximum at a specific wavelength "λ1", and
   wherein said compensating-purpose dispersion D2 becomes minimum at said specific wavelength "λ1",
   wherein said compensating-purpose dispersion D2 is decided so that a bit error rate of said wavelength division multiplexing optical signal at said receiver terminal becomes minimum at a predetermined wavelength "λ0" included in said transmission wavelength band, and
   wherein, at any wavelength "λ", said compensating-purpose dispersion D2 satisfies an equation given by: $D2(\lambda 0)+0.4\{D1(\lambda 0)-D1(\lambda)\} \leq D2(\lambda) \leq D2(\lambda 0)+0.6\{D1(\lambda 0)-D1(\lambda)\}$.

13. A wavelength-division multiplexing optical transmission system including:
   an optical multiplexer for multiplexing plural optical input signals having wavelengths included in a predetermined transmission wavelength band and generating wavelength-division multiplexing optical signal;
   a dispersion-compensating device including a grating, for performing a dispersion compensation to said wavelength-division multiplexing optical signal;
   an optical transmission path for transmitting said wavelength-division multiplexing optical signal from a transmitter terminal to a receiver terminal; and
   an optical receiver for receiving said wavelength-division multiplexing optical signal transmitted through said optical transmission path,
   wherein said dispersion-compensating device provides a compensating-purpose dispersion D2 to said wavelength-division multiplexing optical signal,
   wherein a dispersion D1 generated in said wavelength division multiplexing optical signal during when said wavelength division multiplexing optical signal is transmitted through said transmission path from said transmitter terminal to said receiver terminal becomes maximum at a specific wavelength "λ1", and
   wherein said compensating-purpose dispersion D2 becomes minimum at said specific wavelength "λ1",
   wherein said compensating-purpose dispersion D2 is decided so that an eye aperture degradation of said wavelength division multiplexing optical signal at said receiver terminal becomes minimum at a predetermined wavelength "λ0" included in said transmission wavelength band, and
   wherein, at any wavelength "λ", said compensating-purpose dispersion D2 satisfies an equation given by: $D2(\lambda 0)+0.4\{D1(\lambda 0)-D1(\lambda)\} \leq D2(\lambda) \leq D2(\lambda 0)+0.6\{D1(\lambda 0)-D1(\lambda)\}$.

14. A wavelength-division multiplexing optical transmission system including:
   an optical multiplexer for multiplexing plural optical input signals having wavelengths included in a predetermined transmission wavelength band and generating wavelength-division multiplexing optical signal;
   a dispersion-compensating device including a grating, for performing a dispersion compensation to said wavelength-division multiplexing optical signal;
   an optical transmission path for transmitting said wavelength-division multiplexing optical signal from a transmitter terminal to a receiver terminal; and
   an optical receiver for receiving said wavelength-division multiplexing optical signal transmitted through said optical transmission path,
   wherein said dispersion-compensating device provides a compensating-purpose dispersion D2 to said wavelength-division multiplexing optical signal,
   wherein a dispersion D1 generated in said wavelength division multiplexing optical signal during when said wavelength division multiplexing optical signal is transmitted through said transmission path from said transmitter terminal to said receiver terminal becomes maximum at a specific wavelength "λ1", and
   wherein said compensating-purpose dispersion D2 becomes minimum at said specific wavelength "λ1",
   wherein said dispersion-compensating device further includes:
   an optical circulator coupled between said optical multiplexer and said transmitter terminal; and
   said grating comprises a fiber Bragg grating coupled to said optical circulator for receiving said wavelength-division multiplexing optical signal through said optical circulator from said optical multiplexer and performing said dispersion compensation to said wavelength-division multiplexing optical signal, and said fiber Bragg grating has a variation in a grating pitch Λ which is represented by first and second grating pitch functions Λ1(x) and Λ2(x) smoothly and continuously bounded to each other via a reverse curve point, at which said grating pitch Λ is equal to a critical grating pitch Λ1, and said first grating pitch function Λ1(x) is represented by a first curve being arched upwardly in a first grating pitch range where said grating pitch Λ is smaller than said critical grating pitch Λ1, while said second grating pitch function Λ2(x) is represented by a second curve being arched downwardly in a second grating pitch range where said grating pitch Λ is larger than said critical grating pitch Λ1.

15. A wavelength-division multiplexing optical transmission system including:
   an optical multiplexer for multiplexing plural optical input signals having wavelengths included in a predetermined transmission wavelength band and generating a wavelength-division multiplexing optical signal;
   a dispersion-compensating device including a grating, for performing a dispersion compensation to said wavelength-division multiplexing optical signal;
   an optical transmission path for transmitting said wavelength-division multiplexing optical signal from a transmitter terminal to a receiver terminal; and
   an optical receiver for receiving said wavelength-division multiplexing optical signal transmitted through said optical transmission path,
   wherein said dispersion-compensating device provides a compensating-purpose dispersion D2 to said wavelength-division multiplexing optical signal, wherein a dispersion D1 generated in said wavelength division multiplexing optical signal during when said wavelength division multiplexing optical signal is transmitted through said transmission path from said transmitter terminal to said receiver terminal becomes minimum at a specific wavelength "$\lambda 1$", and
   wherein said compensating-purpose dispersion D2 becomes maximum at said specific wavelength "$\lambda 1$",
   wherein said compensating-purpose dispersion D2 is decided so that a bit error rate of said wavelength division multiplexing optical signal at said receiver terminal becomes minimum at a predetermined wavelength "$\lambda 0$" in said transmission wavelength band, and
   wherein, at any wavelength "$\lambda$", said compensating-purpose dispersion D2 satisfies an equation given by:
   $D2(\lambda 0)+0.4\{D1(\lambda 0)-D1(\lambda)\} \leqq D2(\lambda) \leqq D2(\lambda 0)+0.6\{D1(\lambda 0)-D1(\lambda)\}$.

16. A wavelength-division multiplexing optical transmission system including:
   an optical multiplexer for multiplexing plural optical input signals having wavelengths included in a predetermined transmission wavelength band and generating a wavelength-division multiplexing optical signal;
   a dispersion-compensating device including a grating, for performing a dispersion compensation to said wavelength-division multiplexing optical signal;
   an optical transmission path for transmitting said wavelength-division multiplexing optical signal from a transmitter terminal to a receiver terminal; and
   an optical receiver for receiving said wavelength-division multiplexing optical signal transmitted through said optical transmission path,
   wherein said dispersion-compensating device provides a compensating-purpose dispersion D2 to said wavelength-division multiplexing optical signal, wherein a dispersion D1 generated in said wavelength division multiplexing optical signal during when said wavelength division multiplexing optical signal is transmitted through said transmission path from said transmitter terminal to said receiver terminal becomes minimum at a specific wavelength "$\lambda 1$", and
   wherein said compensating-purpose dispersion D2 becomes maximum at said specific wavelength "$\lambda 1$",
   wherein said compensating-purpose dispersion D2 is decided so that an eye aperture degradation of said wavelength division multiplexing optical signal at said receiver terminal becomes minimum at a predetermined wavelength "$\lambda 0$" included in said transmission wavelength band, and
   wherein, at any wavelength "$\lambda$", said compensating-purpose dispersion D2 satisfies an equation given by:
   $D2(\lambda 0)+0.4\{D1(\lambda 0)-D1(\lambda)\} \leqq D2(\lambda) \leqq D2(\lambda 0)+0.6\{D1(\lambda 0)-D1(\lambda)\}$.

17. A dispersion-compensating device for performing a dispersion compensation to a wavelength-division multiplexing optical signal to be transmitted through an optical transmission path from a transmitter terminal to a receiver terminal, said dispersion-compensating device comprising:
   means for receiving a wavelength-division multiplexing optical signal from the transmitter; and
   means for providing a compensating-purpose dispersion D2 to said wavelength-division multiplexing optical signal, and wherein said compensating-purpose dispersion D2 satisfies conditions that at any wavelength "$\lambda$" included in a transmission wavelength band, if $dD1(\lambda)/d\lambda \neq 0$ and not infinite is established, then $\{dD1(\lambda)/d\lambda\} \times \{dD2(\lambda)/d\lambda\}<0$ is also established, and if $dD1(\lambda)/d\lambda=0$ is established, then $dD2(\lambda)/d\lambda=0$ is also established, where D1 represents a dispersion generated in said wavelength-division multiplexing optical signal during when said wavelength-division multiplexing optical signal is transmitted through said transmission path from said transmitter terminal to said receiver terminal.

18. The dispersion-compensating device as claimed in claim 17, wherein a dispersion D1 generated in said wavelength division multiplexing optical signal during when said wavelength division multiplexing optical signal is transmitted through said transmission path from said transmitter terminal to said receiver terminal becomes maximum at a specific wavelength "$\lambda 1$", and wherein said compensating-purpose dispersion D2 becomes minimum at said specific wavelength "$\lambda 1$".

19. The dispersion-compensating device as claimed in claim 17, wherein a dispersion D1 generated in said wavelength division multiplexing optical signal during when said wavelength division multiplexing optical signal is transmitted through said transmission path from said transmitter terminal to said receiver terminal becomes minimum at a specific wavelength "$\lambda 1$", and wherein said compensating-purpose dispersion D2 becomes maximum at said specific wavelength "$\lambda 1$".

20. The dispersion-compensating device as claimed in claim 17, wherein a dispersion D1 generated in said wavelength division multiplexing optical signal during when said wavelength division multiplexing optical signal is transmitted through said transmission path from said transmitter terminal to said receiver terminal is simply increased by increasing wavelength, and wherein said compensating purpose dispersion D2 is simply decreased by increasing wavelength.

21. The dispersion-compensating device as claimed in claim 17, wherein a dispersion D1 generated in said wavelength division multiplexing optical signal during when said wavelength division multiplexing optical signal is transmitted through said transmission path from said transmitter terminal to said receiver terminal is simply decreased by increasing wavelength, and wherein said compensating-purpose dispersion D2 is simply increased by increasing wavelength.

22. The dispersion-compensating device as claimed in claim 17, wherein said compensating-purpose dispersion D2 is decided so that a sum of said dispersion D1 and said compensating-purpose dispersion D2 is not zero.

23. The dispersion-compensating device as claimed in claim 17, wherein said compensating-purpose dispersion D2 is decided so that a bit error rate of said wavelength division multiplexing optical signal at said receiver terminal becomes minimum at a predetermined wavelength "λ0" included in said transmission wavelength band.

24. The dispersion-compensating device as claimed in claim 23, wherein, at any wavelength "λ", said compensating-purpose dispersion D2 satisfies an equation given by: D2(λ0)+0.4{D1(λ0)−D1(λ)}≦D2(λ)≦D2(λ0)+0.6{D1(λ0)−D1(λ)}.

25. The dispersion-compensating device as claimed in claim 17, wherein said compensating-purpose dispersion D2 is decided so that an eye aperture degradation of said wavelength division multiplexing optical signal at said receiver terminal becomes minimum at a predetermined wavelength "λ0" included in said transmission wavelength band.

26. The dispersion-compensating device as claimed in claim 25, wherein, at any wavelength "λ", said compensating-purpose dispersion D2 satisfies an equation given by: D2(λ0)+0.4{D1(λ0)−D1(λ)}≦D2(λ)≦D2(λ0)+0.6{D1(λ0)−D1(λ)}.

27. The dispersion-compensating device as claimed in claim 17, further including: an optical circulator coupled between said optical multiplexer and said transmitter terminal; and a fiber Bragg grating coupled to said optical circulator for receiving said wavelength-division multiplexing optical signal through said optical circulator from said optical multiplexer and performing said dispersion compensation to said wavelength-division multiplexing optical signal, and said fiber Bragg grating has a variation in a grating pitch Λ which is represented by first and second grating pitch functions Λ1(x) and Λ2(x) smoothly and continuously bounded to each other via a reverse curve point, at which said grating pitch Λ is equal to a critical grating pitch Λ1, and said first grating pitch function Λ1(x) is represented by a first curve being arched upwardly in a first grating pitch range where said grating pitch Λ is smaller than said critical grating pitch Λ1, while said second grating pitch function Λ2(x) is represented by a second curve being arched downwardly in a second grating pitch range where said grating pitch Λ is larger than said critical grating pitch Λ1.

28. A dispersion-compensating device for performing a dispersion compensation to a wavelength-division multiplexing optical signal to be transmitted through an optical transmission path from a transmitter terminal to a receiver terminal, said dispersion-compensating device including:
an optical circulator coupled between an optical multiplexer and said transmitter terminal; and
a fiber Bragg grating coupled to said optical circulator for receiving said wavelength-division multiplexing optical signal through said optical circulator from said optical multiplexer and performing said dispersion compensation to said wavelength-division multiplexing optical signal, and said fiber Bragg grating has a variation in a grating pitch Λ which is represented by first and second grating pitch functions Λ1(x) and Λ2(x) smoothly and continuously bounded to each other via a reverse curve point, at which said grating pitch Λ is equal to a critical grating pitch Λ1, and said first grating pitch function Λ1(x) is represented by a first curve being arched upwardly in a first grating pitch range where said grating pitch Λ is smaller than said critical grating pitch Λ1, while said second grating pitch function Λ2(x) is represented by a second curve being arched downwardly in a second grating pitch range where said grating pitch Λ is larger than said critical grating pitch Λ1.

29. A method of performing a dispersion compensation to a wavelength-division multiplexing optical signal to be transmitted through an optical transmission path from a transmitter terminal to a receiver terminal, wherein said dispersion compensation is made by providing a compensating-purpose dispersion D2 to said wavelength-division multiplexing optical signal, and wherein said compensating-purpose dispersion D2 satisfies conditions that at any wavelength "λ" included in said transmission wavelength band, if dD1(λ)/dλ≠0 and not infinite is established, then {dD1(λ)/dλ}×{dD2(λ)/dλ}<0 is also established, and if dD1(λ)/dλ=0 is established, then dD2(λ)/dλ=0 is also established, where D1 represents a dispersion generated in said wavelength-division multiplexing optical signal during when said wavelength-division multiplexing optical signal is transmitted through said transmission path from said transmitter terminal to said receiver terminal.

30. The method as claimed in claim 29, wherein a dispersion D1 generated in said wavelength division multiplexing optical signal during when said wavelength division multiplexing optical signal is transmitted through said transmission path from said transmitter terminal to said receiver terminal becomes maximum at a specific wavelength "λ1", and wherein said compensating-purpose dispersion D2 becomes minimum at said specific wavelength "λ1".

31. The method as claimed in claim 29, wherein a dispersion D1 generated in said wavelength division multiplexing optical signal during when said wavelength division multiplexing optical signal is transmitted through said transmission path from said transmitter terminal to said receiver terminal becomes minimum at a specific wavelength "λ1", and wherein said compensating-purpose dispersion D2 becomes maximum at said specific wavelength "λ1".

32. The method as claimed in claim 29, wherein a dispersion D1 generated in said wavelength division multiplexing optical signal during when said wavelength division multiplexing optical signal is transmitted through said transmission path from said transmitter terminal to said receiver terminal is simply increased by increasing wavelength, and wherein said compensating-purpose dispersion D2 is simply decreased by increasing wavelength.

33. The method as claimed in claim 29, wherein a dispersion D1 generated in said wavelength division multiplexing optical signal during when said wavelength division multiplexing optical signal is transmitted through said transmission path from said transmitter terminal to said receiver terminal is simply decreased by increasing wavelength, and wherein said compensating-purpose dispersion D2 is simply increased by increasing wavelength.

34. The method as claimed in claim 29, wherein said compensating-purpose dispersion D2 is decided so that a sum of said dispersion D1 and said compensating-purpose dispersion D2 is not zero.

35. The method as claimed in claim 29, wherein said compensating-purpose dispersion D2 is decided so that a bit error rate of said wavelength division multiplexing optical signal at said receiver terminal becomes minimum at a predetermined wavelength "λ0" included in said transmission wavelength band.

36. The method as claimed in claim 35, wherein, at any wavelength "λ", said compensating-purpose dispersion D2 satisfies an equation given by: D2(λ0)+0.4{D1(λ0)−D1(λ)}≦D2(λ)≦D2(λ0)+0.6{D1(λ0)−D1(λ)}.

37. The method as claimed in claim 29, wherein said compensating-purpose dispersion D2 is decided so that an eye aperture degradation of said wavelength division multiplexing optical signal at said receiver terminal becomes minimum at a predetermined wavelength "λ0" included in said transmission wavelength band.

38. The method as claimed in claim 37, wherein, at any wavelength "λ", said compensating-purpose dispersion D2 satisfies an equation given by: $D2(\lambda 0)+0.41\{D1(\lambda 0)-D1(\lambda)\} \leqq D2(\lambda) \leqq D2(\lambda 0)+0.6\{D1(\lambda 0)-D1(\lambda)\}$.

* * * * *